(12) United States Patent
Kim et al.

(10) Patent No.: US 12,380,913 B2
(45) Date of Patent: Aug. 5, 2025

(54) SOUND SIGNAL PROCESSING APPARATUS AND METHOD OF PROCESSING SOUND SIGNAL

(71) Applicant: SAMSUNG ELECTRONICS CO., LTD., Suwon-si (KR)

(72) Inventors: Cheheung Kim, Yongin-si (KR); Hyunwook Kang, Daejeon (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 329 days.

(21) Appl. No.: 17/710,207

(22) Filed: Mar. 31, 2022

(65) Prior Publication Data

US 2022/0392479 A1 Dec. 8, 2022

(30) Foreign Application Priority Data

Jun. 4, 2021 (KR) .................. 10-2021-0072966
Dec. 2, 2021 (KR) .................. 10-2021-0171203

(51) Int. Cl.
*G10L 21/0216* (2013.01)
*G10L 21/0364* (2013.01)
(Continued)

(52) U.S. Cl.
CPC ...... *G10L 21/0364* (2013.01); *G10L 21/0216* (2013.01); *H04R 3/005* (2013.01); *G10L 2021/02165* (2013.01)

(58) Field of Classification Search
CPC ............. G10L 21/0364; G10L 21/0216; G10L 2021/02165; G10L 21/06; G10L 21/0272;
(Continued)

(56) References Cited

U.S. PATENT DOCUMENTS 9,497,544 B2   11/2016   Mohammad et al.
9,753,311 B2    9/2017   Fan
(Continued)

FOREIGN PATENT DOCUMENTS

EP    2925016 A2 *  9/2015 ............... H04R 1/08
JP    6514599 B2     5/2019
(Continued)

OTHER PUBLICATIONS

"Designing optimized microphone beamformers", Feb. 1, 2018, DSP Concepts, 15 pages total.
(Continued)

*Primary Examiner* — Daniel C Washburn
*Assistant Examiner* — Penny L Caudle
(74) *Attorney, Agent, or Firm* — Sughrue Mion, PLLC

(57) ABSTRACT

A sound signal processing apparatus may include: a directional microphone configured to detect a user voice signal including a user's voice by arranging the directional microphone to face an utterance point of the user's voice; a non-directional microphone configured to detect a mixed sound signal comprising the user voice and an external sound; and a processor configured to generate an external sound signal by attenuating the user's voice from the mixed sound signal, by differentially calculating the user voice signal from the mixed sound signal.

18 Claims, 31 Drawing Sheets

(51) Int. Cl.
*H04R 3/00* (2006.01)
*H04R 17/02* (2006.01)
*G10L 15/26* (2006.01)

(58) Field of Classification Search
CPC ........ H04R 3/005; H04R 17/10; H04R 1/326;
H04R 17/02; H04R 2410/01; H04R
2410/05; H04R 1/1083; H04R 1/08;
H04R 1/342; H04R 2430/00
See application file for complete search history.

(56) References Cited

U.S. PATENT DOCUMENTS

| | | | |
|---|---|---|---|
| 10,225,662 | B2 | 3/2019 | Kim |
| 10,229,697 | B2 | 3/2019 | Bastyr et al. |
| 2008/0069372 | A1 | 3/2008 | Zhang et al. |
| 2008/0317259 | A1 | 12/2008 | Zhang et al. |
| 2010/0185308 | A1* | 7/2010 | Yoshida .................... H04S 7/00 |
| | | | 381/119 |
| 2011/0288860 | A1* | 11/2011 | Schevciw ............... G10L 25/78 |
| | | | 704/E15.039 |
| 2014/0003611 | A1 | 1/2014 | Mohammad et al. |
| 2014/0181741 | A1* | 6/2014 | Apacible ............. G06Q 10/109 |
| | | | 715/764 |
| 2014/0270244 | A1 | 9/2014 | Fan |
| 2014/0278394 | A1 | 9/2014 | Bastyr et al. |
| 2014/0350926 | A1* | 11/2014 | Schuster ............. G10L 21/0208 |
| | | | 704/233 |
| 2016/0112817 | A1 | 4/2016 | Fan et al. |
| 2019/0005977 | A1 | 1/2019 | Olsson |
| 2019/0122690 | A1 | 4/2019 | Kim et al. |
| 2019/0146753 | A1 | 5/2019 | Parkinson et al. |
| 2019/0174244 | A1 | 6/2019 | Kim et al. |
| 2019/0200119 | A1 | 6/2019 | Kang et al. |
| 2020/0077179 | A1 | 3/2020 | Wang |
| 2020/0194028 | A1 | 6/2020 | Lipman |
| 2020/0245147 | A1* | 7/2020 | Segal .................... H04W 12/63 |
| 2021/0043167 | A1 | 2/2021 | Cartier et al. |
| 2021/0138232 | A1* | 5/2021 | Paz ....................... A61N 1/0456 |

FOREIGN PATENT DOCUMENTS

| | | | |
|---|---|---|---|
| KR | 10-1959690 B1 | 7/2019 | |
| KR | 10-2195773 B1 | 12/2020 | |
| WO | WO-2020071331 A1 * | 4/2020 | ......... G10L 21/0224 |
| WO | WO-2020133312 A1 * | 7/2020 | ............... B81B 7/02 |
| WO | WO-2020189410 A1 * | 9/2020 | |

OTHER PUBLICATIONS

Berghe, et al., "An adaptive noise canceller for hearing aids using two nearby microphones", Jun. 1998, Acoustical Society of America, vol. 10, Issue 6, 6 pages total, XP012000334.
Communication issued Nov. 10, 2022 by the European Patent Office in European Patent Application No. 22166574.8.
Communication issued Jan. 2, 2025 by the European Patent Office for European Patent Application No. 24205029.2.

* cited by examiner

SOUND SIGNAL PROCESSING APPARATUS AND METHOD OF PROCESSING SOUND SIGNAL

CROSS-REFERENCE TO RELATED APPLICATIONS

This application is based on and claims priority under 35 U.S.C. § 119 to Korean Patent Application No. 10-2021-0072966, filed on Jun. 4, 2021 and 10-2021-0171203, filed on Dec. 2, 2021, in the Korean Intellectual Property Office, the disclosures of which are incorporated by reference herein in their entirety.

BACKGROUND

1. Field

Apparatuses and methods consistent with example embodiments relate to processing sound signals.

2. Description of the Related Art

The use of sound sensors installed in various electronic devices to sense sound is increasing. A plurality of sound sensors are employed in electronic devices to distinguish various types of received sounds or to sense only a specific sound. However, in order to improve the accuracy of sensing a specific sound, a large number of sound sensors are required, and thus, process cost, complexity, and power consumption increase. Additionally, when the plurality of sound sensors are used to receive the sound signals, the complexity of a time delay calculation for the sound signals also increases. Accordingly, there is a need for a technology for clearly and efficiently sensing a specific sound.

In addition, the use of wearable devices equipped with sound sensors is increasing. Due to the characteristics of the wearable device that may be used in various sound environments, a technology for clearly discriminating and sensing a user's voice and sound generated from outside the user is required.

SUMMARY

One or more example embodiments provide sound signal processing apparatuses and methods of processing the sound signal. Further, one or more example embodiments provide computer-readable recording media in which a program for executing the method in a computer is recorded. The technical problems to be achieved are not limited to the above technical problems, and other technical problems may be inferred from the following embodiments.

According to an aspect of an example embodiment, a sound signal processing apparatus may include: a directional microphone configured to detect a user voice signal including a user's voice by arranging the directional microphone to face an utterance point of the user's voice; a non-directional microphone configured to detect a mixed sound signal including the user voice and an external sound; and a processor configured to generate an external sound signal by attenuating the user's voice from the mixed sound signal, by differentially calculating the user voice signal from the mixed sound signal.

The directional microphone may include a plurality of vibration structures configured to sense sound of different frequency bands, wherein each of the plurality of vibration structures may include a vibrator that forms one plane for receiving the mixed sound signal, and as the mixed sound signal is received, vibrates in a direction orthogonal to the one plane based on a frequency of the mixed sound signal.

The vibrator vibrates with a vibration intensity based on an angle between a propagation direction of the mixed sound signal and the one plane formed by the vibrator.

The vibrator vibrates with a higher vibration intensity as the angle approaches 90°, and vibrates with a lower vibration intensity as the angle approaches 0°.

The directional microphone is arranged so that an angle formed between the one plane and a direction from the utterance point of the user's voice is in a range of 60° to 120°.

Each of the plurality of vibration structures may include a vibration detector configured to receive a vibration of the vibrator.

The directional microphone is configured to determine an electrical signal to be attenuated from among electrical signals generated by the vibration structures, and attenuate the determined electrical signal.

The directional microphone is further configured to determine a threshold value based on an average magnitude of the electrical signals generated by the vibration structures.

The sound signal processing apparatus may include an adaptive filter configured to adjust parameters for combining the user voice signal and the mixed sound signal, so that the user's voice is attenuated from the mixed sound signal based on a feedback signal, wherein the processor is further configured to: generate the feedback signal by differentially calculating a signal output from the adaptive filter from the mixed sound signal as the user voice signal is input to the adaptive filter; and control the adaptive filter to adjust the parameters by inputting the feedback signal to the adaptive filter.

The sound signal processing apparatus may include a display configured to output visual information, wherein the processor is further configured to perform a first function corresponding to the user voice signal and a second function corresponding to the external sound signal, and control the display so that a performance result of each of the first function and the second function is displayed in different regions of the display.

The sound signal processing apparatus is a glasses-type wearable apparatus, the directional microphone and the non-directional microphone are arranged on a glasses frame of the glasses-type wearable apparatus, and the directional microphone is arranged so that one plane for receiving the mixed sound faces the utterance point of the user's voice.

The directional microphone is arranged on a glasses bridge or the glasses frame of the glasses-type wearable apparatus, and the non-directional microphone is separated from the directional microphone and is arranged on a frame or leg of the glasses-type wearable apparatus.

The non-directional microphone is configured to generate a first external sound signal from which the user's voice is attenuated, from the mixed sound signal, by arranging a plane receiving the mixed sound signal in a direction different from a direction in which the direction microphone is arranged, and in a direction corresponding to a point where the external sound is generated; and the processor is further configured to generate a second external sound signal from which the user's voice is further attenuated than that of the first external sound signal, by differentially calculating the user voice signal from the first external sound signal.

According to another aspect of the present application, a sound signal processing apparatus may include: a first microphone configured to receive a mixed sound including an output sound from a speaker and an external sound generated from outside the speaker, and generate an output sound signal from which the external sound is attenuated, from the mixed sound, by arranging a plane for receiving the mixed sound in a direction corresponding to a point where the output sound is generated; a second microphone configured to receive the mixed sound and generate a mixed sound signal from the received mixed sound; and a processor configured to generate an external sound signal from which the output sound is attenuated, by differentially calculating the output sound signal from the mixed sound signal.

According to another aspect of the present application, a method of processing a sound signal may include: receiving a mixed sound including a user's voice and an external sound generated from outside the user; generating a mixed sound signal from the mixed sound; generating a user voice signal from which the external sound is attenuated, from the received mixed sound; and generating an external sound signal from which the user's voice is attenuated, by differentially calculating the user voice signal from the mixed sound signal.

The receiving of the mixed sound may include: vibrating each of a plurality of vibration structures that are configured to sense sound of different frequency bands, in a direction orthogonal to one plane formed to receive the mixed sound, based on a frequency of the received mixed sound.

The vibrating each of the plurality of vibration structures may include vibrating each of the plurality of vibration structures with a vibration intensity based on an angle formed between a propagation direction of the received sound and the one plane.

The vibrating each of the plurality of vibration structures further includes vibrating each of the plurality of vibration structures with a higher vibration intensity as an angle approaches 90°, and vibrating each of the plurality of vibration structures with a lower vibration intensity as an angle approaches 0°.

The vibrating each of the plurality of vibration structures further includes generating electrical signals respectively corresponding to vibrations of the plurality of vibration structures.

The generating of the user voice signal may include determining an electrical signal to be attenuated among the electrical signals, based on a threshold value that is set according to an average magnitude of the electrical signals, and attenuating the determined electrical signal.

The generating of the external sound signal may include inputting the user voice signal to an adaptive filter, generating a feedback signal by differentially calculating a signal output from the adaptive filter from the mixed sound signal, and controlling the adaptive filter to adjust parameters for combining the mixed sound signal and the user voice signal by inputting the feedback signal to the adaptive filter.

According to another aspect of the present application, a non-transitory computer-readable recording medium having recorded thereon a program for executing a method of processing a sound signal, the method including: receiving a mixed sound including a user's voice and an external sound generated from outside the user; generating a mixed sound signal from the mixed sound; generating a user voice signal from which the external sound is attenuated, from the received mixed sound; and generating an external sound signal from which the user's voice is attenuated, by differentially calculating the user voice signal from the mixed sound signal.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
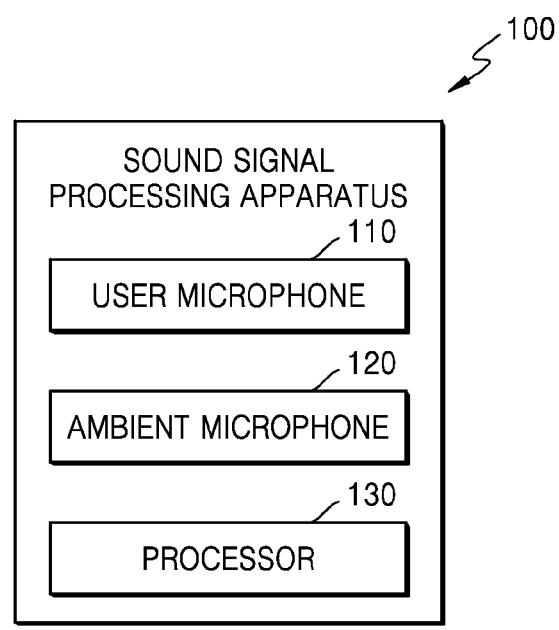
FIG. 1 is a block diagram illustrating a configuration of an sound signal processing apparatus according to an example embodiment.

Example embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the example embodiments. However, it is apparent that the example embodiments can be practiced without those specifically defined matters. Also, well-known functions or constructions are not described in detail since they would obscure the description with unnecessary detail.

As used herein, the term "and/or" includes any and all combinations of one or more of the associated listed items. Expressions such as "at least one of," when preceding a list of elements, modify the entire list of elements and do not modify the individual elements of the list.

Terminologies used herein are selected as commonly used by those of ordinary skill in the art in consideration of functions of the current embodiment, but may vary according to the technical intention, precedents, or a disclosure of a new technology. Also, in particular cases, some terms are arbitrarily selected by the applicant, and in this case, the meanings of the terms will be described in detail at corresponding parts of the specification Accordingly, the terms used in the specification should be defined not by simply the names of the terms but based on the meaning and contents of the whole specification.

In the descriptions of the embodiments, it will be understood that, when an element is referred to as being connected to another element, it may include electrically connected when the element is directly connected to the other element and when the element is indirectly connected to the other element by intervening a constituent element. Also, it should be understood that, when a part "comprises" or "includes" a constituent element in the specification, unless otherwise defined, it is not excluding other elements but may further include other elements.

It will be further understood that the term "comprises" or "includes" should not be construed as necessarily including various constituent elements and various operations described in the specification, and also should not be construed that portions of the constituent elements or operations of the various constituent elements and various operations may not be included or additional constituent elements and operations may further be included.

It will be understood that, although the terms 'first', 'second', etc. may be used herein to describe various constituent elements, these constituent elements should not be limited by these terms. These terms are only used to distinguish one constituent element from another.

The descriptions of the embodiments should not be interpreted as limiting the scope of right, and embodiments that are readily inferred from the detailed descriptions and embodiments by those of ordinary skill in the art will be construed as being included in the inventive concept. Reference will now be made in detail to embodiments, examples of which are illustrated in the accompanying drawings.

FIG. 1 is a block diagram illustrating a configuration of a sound signal processing apparatus according to an example embodiment.

Referring to FIG. 1, the sound signal processing apparatus 100 may include a user microphone 110, an ambient microphone 120, and a processor 130. In the sound signal processing apparatus 100 illustrated in FIG. 1, components related to the present embodiments are illustrated. Accordingly, it is apparent to those skilled in the art that general-purpose components other than the components shown in FIG. 1 may further be included in the sound signal processing apparatus 100.

The sound signal processing apparatus 100 may be a wearable device worn by a user to receive the user's voice. Alternatively, the sound signal processing apparatus 100 is not wearable by the user and may be disposed adjacent to the sound output apparatus or included in the sound output apparatus. However, this is only an example, and the sound signal processing apparatus 100 may be modified and implemented in various forms capable of receiving sound. Examples of the sound signal processing apparatus 100 will be described later with reference to FIG. 17A.

The sound signal processing apparatus 100 may include different types of microphones to generate various sound signals for the received sound. Even if the same sound is received, the sound signal generated by the microphone may be different according to the configuration and operation of the microphone. Accordingly, the sound signal processing apparatus 100 may generate a target sound signal by including different types of microphones. The sound signal processing apparatus 100 may include a user microphone 110 for detecting a user's voice and an ambient microphone 120 for detecting a whole sound including the user's voice. The whole sound may be a mixed sound signal including the user's voice and other ambient sound.

The user microphone 110 and the ambient microphone 120 may receive the whole sound including the user's voice and an external sound generated from outside the user. The user's voice may correspond to the voice of a user who uses or wears the sound signal processing apparatus 100. The external sound is a sound received from the outside of the user and may correspond to a sound other than the user's voice. For example, the external sound may include a voice of an outsider having a conversation with the user, a sound output from an image viewed by the user, or a sound generated in an environment around the user. The whole sound is a sound including both a user's voice and an external sound, and may correspond to all sounds transmitted (or received) to the sound signal processing apparatus 100. The whole sound is transmitted (or received by) to the user microphone 110, but external sound may be attenuated from the whole sound by a structure or operation of the user microphone 110, and thus, a user voice signal may be generated.

The user microphone 110 and the ambient microphone 120 may convert a received sound into an electrical signal including information, such as frequency, amplitude, and time.

The user microphone 110 may generate a user voice signal by attenuating an external sound from the whole received sound. The user microphone 110 may generate a further clearer user voice signal by attenuating the external sound. For example, the user microphone 110 may have directivity with respect to a user's voice in order to attenuate a received external sound. Alternatively, the user microphone 110 may attenuate a signal corresponding to the external sound based on a threshold value. The configuration and operation of the user microphone 110 will be described later with reference to FIG. 2.

Also, the user microphone 110 may receive a sound through one plane formed by the user microphone 110. Here, the one plane may denote a plane formed by a vibrating unit of the user microphone 110 or may denote a plane formed by a plurality of vibrating units arranged in a plane. The user microphone 110 may be arranged in the sound signal processing apparatus 100 so that the one plane formed by the user microphone 110 is disposed in a direction corresponding to the point of utterance of the user's voice, or to face the positon of utterance of the user's voice. Due to the arrangement of the user's microphone 110, the user's voice may be sensed with a high sensitivity and an external sound may be sensed with a low sensitivity. Accordingly, an external sound is attenuated from the whole sound received by the user microphone 110, and the user voice signal, which is a sound signal generated by the user microphone 110, may be a signal from which the external sound is attenuated.

For example, the user microphone 110 may be disposed in the sound signal processing apparatus 100 so that an angle formed between the one plane receiving the whole sound and a direction from the utterance point of the user's voice to the one plane is in a range of 60° to 120°. The arrangement of the user microphone 110 (or the vibrator of the user microphone) will be described later with reference to FIGS. 10A and 10B.

The ambient microphone 120 may generate a whole sound signal from the received whole sound. The ambient microphone 120 may generate a whole sound signal from which neither the user's voice nor the external sound is attenuated or emphasized.

The processor 130 may receive the sound signals generated by microphones and perform an operation with respect to the received sound signals. The processor 130 may generate an external sound signal by differentially calculating the user voice signal from the whole sound signal. The external sound signal may be a signal from which a signal corresponding to the user's voice is attenuated from the whole sound signal. Accordingly, the external sound signal may include only a signal corresponding to the external sound or may be a signal in which a signal corresponding to the external sound is emphasized. Here, the emphasis of a specific signal does not mean that the specific signal is amplified, but rather that the specific signal becomes clear as other signals are attenuated.

A method for the processor 130 to perform the difference operation will be described later with reference to FIGS. 13 and 14.

The processor 130 may be implemented as an array of a plurality of logic gates, or may be implemented as a combination of a general-purpose microprocessor and a memory in which a program executable in the microprocessor is stored. In addition, it may be understood by those skilled in the art that the present embodiment may be implemented in other types of hardware.

As described above, because the sound signal processing apparatus 100 may generate a user voice signal separately from an external sound signal, it is possible to distinguish the user's voice and the external sound from whole received sounds. That is, even when a user's voice and an external sound are simultaneously received by the sound signal processing apparatus 100, the sound signal processing apparatus 100 may distinguish each sound and generate a signal corresponding to each sound. Accordingly, the sound signal processing apparatus 100 may perform a function or process a command corresponding to each of a user's voice and an external sound in any sound environment.

Figure 2:
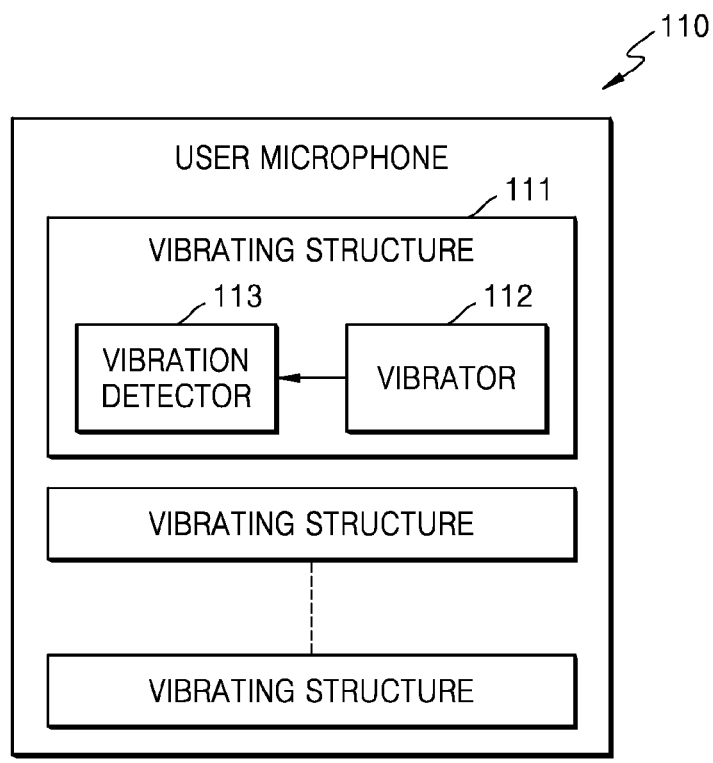
FIG. 2 is a block diagram illustrating a configuration of a user microphone according to an example embodiment.

FIG. 2 is a block diagram illustrating a configuration of a user microphone 110 according to an example embodiment.

Referring to FIG. 2, the user microphone 110 may include a plurality of vibration structures 111. Each vibration structure 111 may include a vibrator 112 and a vibration detector 113. In the user microphone 110 shown in FIG. 2, components related to the present embodiments are shown. Accordingly, it is apparent to those skilled in the art that other general-purpose components other than the components shown in FIG. 2 may further be included in the user microphone 110. For example, the user microphone 110 may further include a support or a sound controller.

The user microphone 110 may include a plurality of vibration structures 111 configured to sense sounds of different frequency bands. The plurality of vibration structures 111 may be formed in different shapes (e.g., length, thickness, shape, weight, etc.) and may have a resonant frequency corresponding to the shape. The plurality of vibration structures 111 may sense sound in a frequency band corresponding to each resonant frequency. A detailed structure of the vibration structure 111 will be described later with reference to FIGS. 3 and 4A.

The vibrator 112 may vibrate as the whole sound is received. For example, the vibrator 112 may vibrate as a sound having a frequency close to the resonant frequency of the vibrator 112 is received. Each vibrator 112 may form a plane for receiving a whole sound. In addition, as the vibrators 112 are arranged in a plane within the user microphone 110, the user microphone 110 may form one plane corresponding to a plurality of planes of the vibrators 112. As the whole sound is received, the vibrator 112 may vibrate in a direction orthogonal to one plane based on the frequency of the whole sound. One plane formed by the vibrator 112 will be described later with reference to FIG. 4A.

The vibration detector 113 may receive the vibration of the vibrator 112 and generate an electrical signal corresponding to the received vibration. As the vibration is converted into an electrical signal by the vibration detector 113, the sound signal processing apparatus 100 may perform various processes and operations on the received sound.

Figure 3:
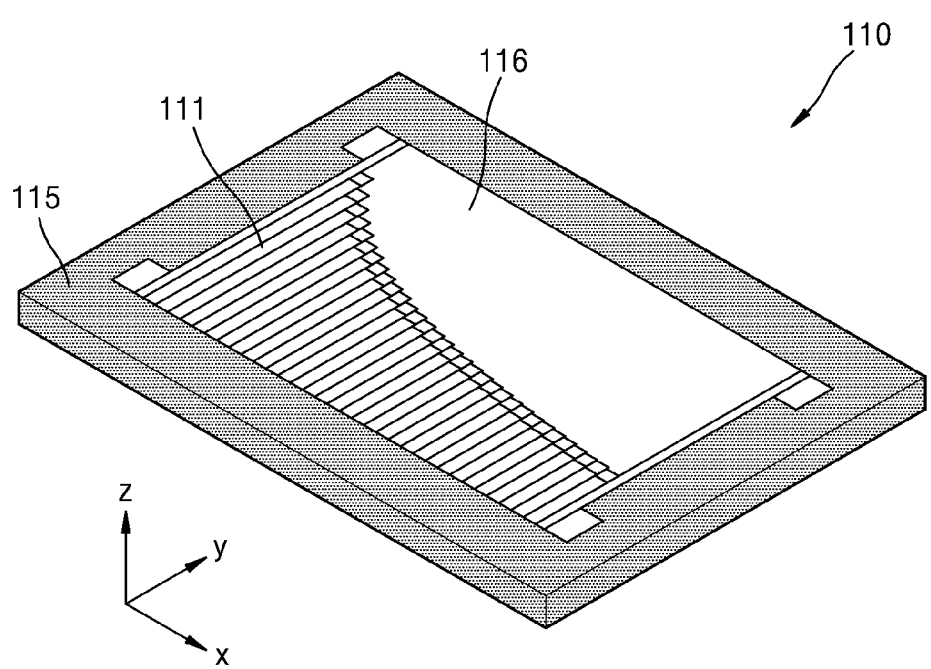
FIG. 3 is a diagram illustrating a configuration of a user microphone.

FIG. 3 is a diagram illustrating a configuration of the user microphone 110.

Referring to FIG. 3, the user microphone 110 may include a support 115 and a plurality of vibration structures 111. The support 115 may be formed to support the plurality of vibration structures 111 in a cavity (or a through-hole) 116. For example, the support 115 may be a silicon substrate, but is not limited thereto.

The plurality of vibration structures 111 may be arranged in a predetermined shape on the cavity 116 of the support 115. The vibration structures 111 may be arranged in a plane without overlapping each other. Each vibrating structure 111, as shown, may be arranged so that one side is fixed to the support 115 and the other side extends toward the cavity 116.

The vibration structure 111 may be configured to sense, for example, sound frequencies of different bands. That is, the vibration structures 111 may be configured to have different center frequencies or resonant frequencies. To this end, the vibration structure 111 may be provided to have different dimensions. The dimension of the vibrating structure 111 may be set in consideration of a resonant frequency desired for the vibrating structure 111.

Figure 4A:
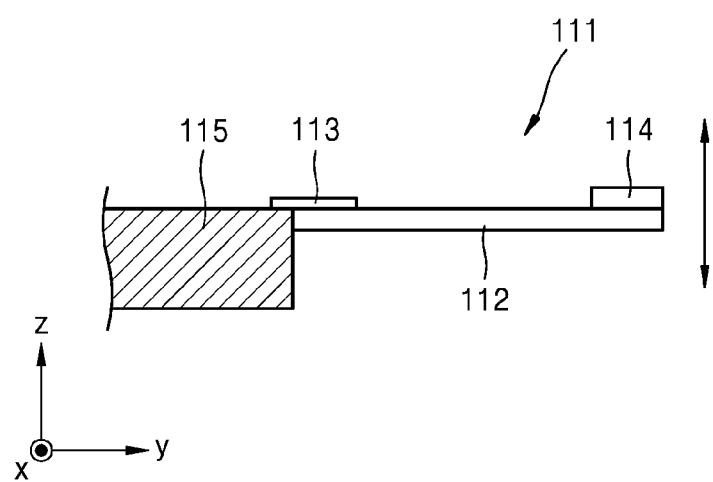
FIGS. 4A to 4C are cross-sectional views of the sensing device of FIG. 3.
Figure 4B:
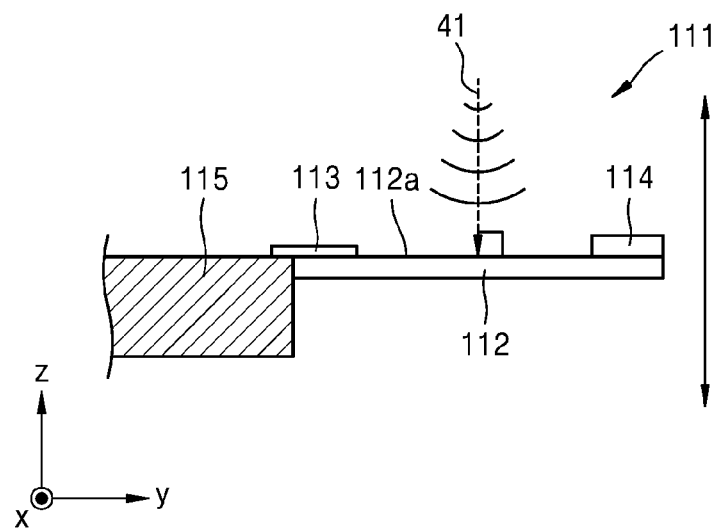
Figure 4C:
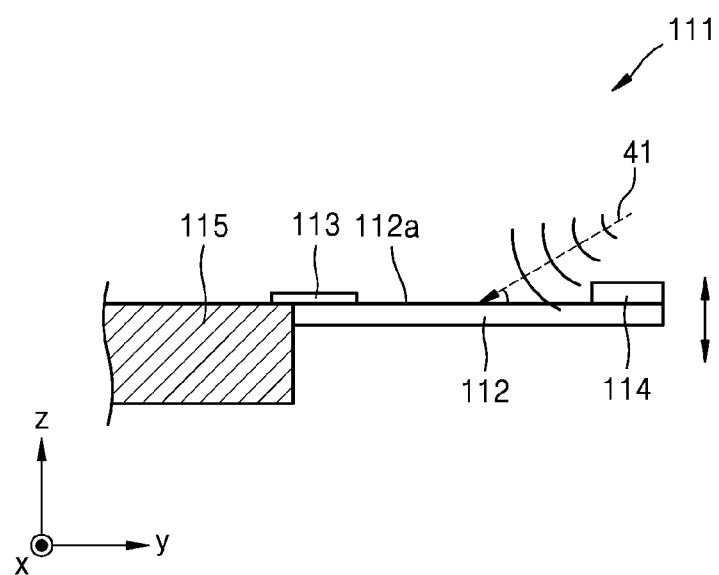

FIGS. 4A to 4C are cross-sectional views illustrating a vibration structure 111 of FIG. 3.

Referring to FIG. 4A, the vibration structure 111 may include the vibrator 112, the vibration detector 113, and a mass body 114. As shown, the vibrating structure 111 may be arranged so that one side is fixed to the support 115 and the other side extends toward the cavity 116.

Each vibration structure 111 may include the vibrator 112 configured to vibrate in response to an input sound, and the vibration detector 113 configured to sense the movement of the vibrator 112. In addition, the vibrating structure 111 may further include the mass body 114 for providing a predetermined mass to the vibrator 112.

The vibrator 112 may vibrate based on a frequency of a received sound. The vibrator 112 may vibrate significantly as the frequency of the received sound approaches the resonant frequency, and vibrates slightly as the frequency of the received sound is farther from the resonant frequency. Alternatively, the vibrator 112 may vibrate when a sound of a sensible frequency band is received, and may not vibrate when a sound outside the sensible frequency band is received.

The vibrator 112 may have a cantilever structure that extends horizontally, and is supported at only one end. The vibrator 112 may be formed as a beam or plate, and one end of the beam is connected to the support 115 and an opposing end of the beam overhangs without additional support.

Referring to FIGS. 4B and 4C, the vibrator 112 may form a plane 112a for receiving a sound.

The vibrator 112 may vibrate in a direction orthogonal to the one plane 112a as the whole sound is received. The vibrator 112 may vibrate with an intensity based on an angle between the propagation direction 41 of a receiving sound and the one plane 112a. The vibrator 112 may vibrate with a large vibration intensity as the angle between the propagation direction 41 of the sound and the plane 112a approaches 90°, and vibrates with a small vibration strength as the angle approaches 0°.

As shown in FIG. 4B, when a sound propagating at an angle of 90° with respect to one plane 112a is received, the vibrator 112 may vibrate with the greatest vibration intensity. In addition, as shown in FIG. 4C, when a sound propagating at an angle less than 90° with respect to one plane 112a is received, the vibrator 112 may vibrate with a vibration intensity less than that in FIG. 4B.

Due to the vibrating operation of the vibrator 112 as described above, the user's microphone 110 (or vibrating structures 111) may be arranged in the sound signal processing apparatus 100 in consideration of the sound propagation direction 41. For example, the user's microphone 110 may be arranged in the sound signal processing apparatus 100 so that the user's voice is propagated to the plane 112a at an angle close to 90°. In other words, the user's microphone 110 may be arranged so that the one plane 112a faces an utterance point of the user's voice, and this arrangement will be described later with reference to FIGS. 10A and 10B.

Figure 5:
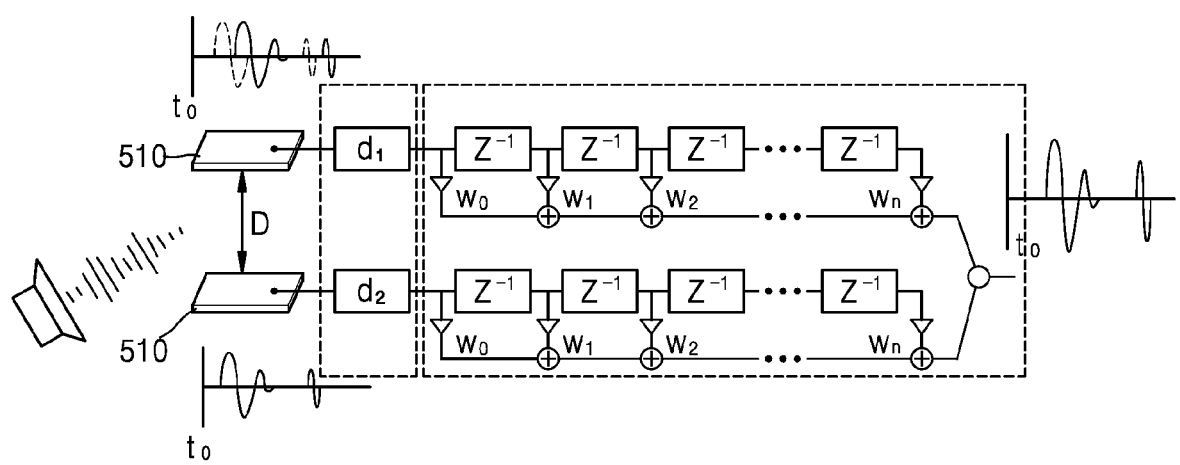
FIG. 5 is a diagram for explaining a sound sensing method using ambient microphones, according to a comparative example.

FIG. 5 is a diagram for explaining a sound sensing method using ambient microphones according to a comparative example.

The sound sensing method according to the comparative example of FIG. 5 may use a plurality of ambient microphones 510 to maximize sound in a specific direction. The plurality of ambient microphones 510 are arranged with a predetermined interval D, due to the interval D, a time or phase delay for sound to reach each ambient microphone 510 occurs, and by varying the degree of compensating for the time or phase delay occurred, the overall directivity may be adjusted. This directivity control method may be referred to as Time Difference of Arrival (TDOA).

However, the method described above assumes that there is a difference in the time for sound to reach each ambient microphone 510, and because the interval must be set in consideration of a wavelength of an audible frequency band, there may be a restriction in setting the interval between the ambient microphones 510. Because there is a restriction in setting the interval, there may be a restriction on the miniaturization of the apparatus for performing the above-described method. In particular, because the low frequency has a long wavelength, the interval between the ambient microphones 510 is set to be wide in order to distinguish the low frequency sound, and a signal-to-noise ratio (SNR) of each ambient microphone 510 must be high.

In addition, in the method described above, because the phase is different according to the frequency band of the sound sensed by each ambient microphone 510, it may be necessary to compensate the phase for each frequency. In order to compensate the phase for each frequency, the method described above may require a complex signal processing process of applying an appropriate weight to each frequency.

Unlike the comparative example of FIG. 5, the sound signal processing apparatus 100 according to an example embodiment may not require restrictions on the distance between microphones. The sound signal processing apparatus 100 may acquire sound in a specific direction by distinguishing directions using a simple operation without complex signal processing. Hereinafter, an efficient structure and operation of the sound signal processing apparatus 100 will be described in detail with reference to the drawings.

Figure 6:
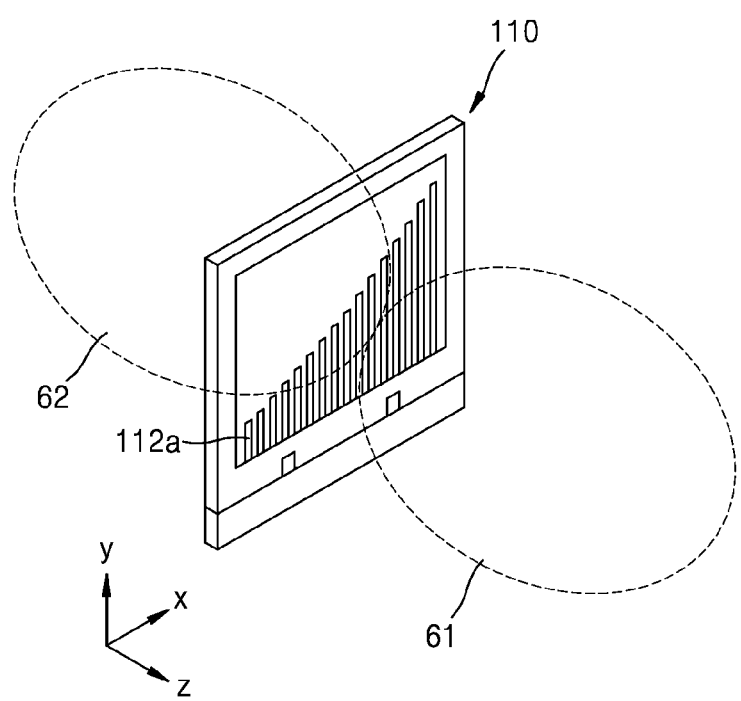
FIG. 6 is a diagram for describing a directivity pattern of a user's microphone, according to an example embodiment.

FIG. 6 is a diagram for describing a directivity pattern of a user's microphone 110 according to an example embodiment.

Referring to FIG. 6, the user microphone 110 may have bi-directional signal patterns 61 and 62. For example, the bi-directional signal patterns 61 and 62 may be a figure-8 directional pattern including a front plane unit 61 oriented toward a front (+z direction) of the user microphone 110 and a rear plane unit 62 oriented toward a rear (−z direction) of the user microphone 110.

When a sound source is on a primary axis of the user microphone 110, and a sound is propagated vertically to the plane 112a formed by the vibrator 112, the vibrator 112 may react most sensitively and vibrate with a great vibration intensity. Accordingly, a directivity pattern may be formed based on sensitive directions of the front direction (+z direction) and the rear direction (−z direction) of the user microphone 110, which is a direction orthogonal to the one plane 112a. In this case, the sensitivity of the user's microphone 110 to the sound may reduce when the user's microphone 110 moves off-axis and the sound is received in a non-sensitive direction (e.g., +x direction and −x direction). Accordingly, the user's microphone 110 may attenuate a sound received in a non-sensitive direction (e.g., +x direction and −x direction).

Depending on the structure of the user's microphone 110, a unidirectional signal pattern in the +z direction or −z direction may be formed by blocking the reception of sound on one plane. The directivity patterns described above of the user microphone 110 are merely examples, and the directivity patterns may be variously modified according to the arrangement of the vibrating structures 111 (or vibrators 112).

Figure 7:
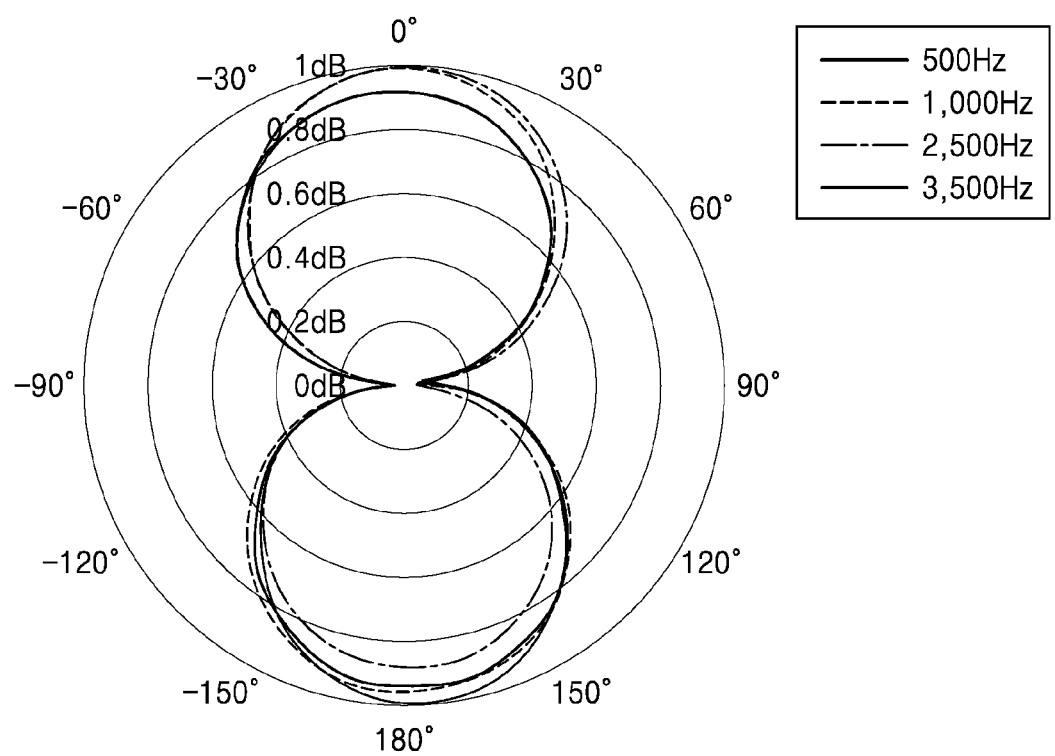
FIG. 7 is a diagram illustrating a result of measuring a directivity pattern of a user's microphone.

FIG. 7 is a diagram illustrating a result of measuring a directivity pattern of a user's microphone.

As shown in FIG. 7, it may be confirmed that the user's microphone has a uniformly bi-directional signal pattern with respect to various frequencies. That is, it may be confirmed that a 0° direction and a 180° direction for various frequencies have directivity in the +z axis direction and the −z axis direction of FIG. 6.

Figure 8:
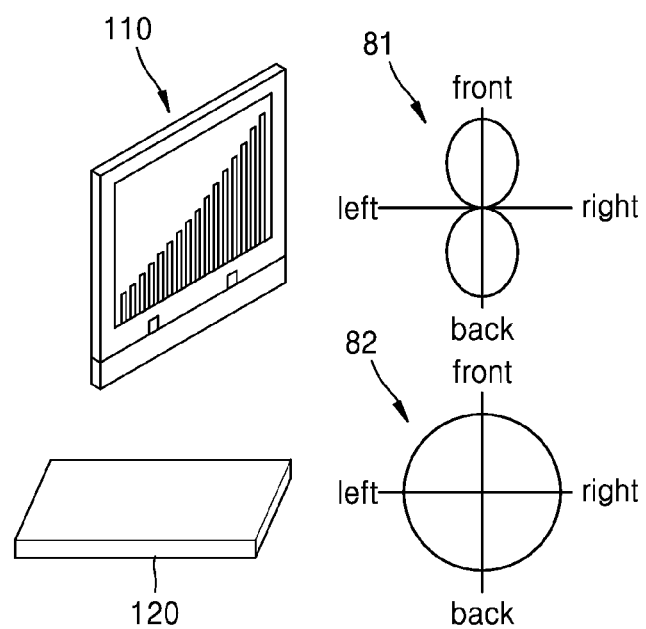
FIG. 8 is a diagram for describing signal processing of a sound signal processing apparatus according to an example embodiment.

FIG. 8 is a diagram for describing a signal processing of a sound signal processing apparatus according to an example embodiment.

Referring to FIG. 8, the user microphone 110 may have a bi-directional signal pattern 81, and the ambient microphone 120 may have an omni-directional or non-directional signal pattern 82. The user microphone 110 may sense a sound that is in-phase with a phase of the sound sensed by the ambient microphone 120 from a front direction of the bi-directional signal pattern 81 (e.g., +z direction in FIG. 6), and a sound that is anti-phase to a phase of a sound sensed by the ambient microphone 120 from a rear direction (e.g., −z direction in FIG. 6). However, the directivity pattern of the user microphone 110 shown in FIG. 8 is merely an example, and as described above, the directivity pattern may be variously modified according to the structure of the user microphone 110 and the arrangement of vibration structures 111 (or vibrators).

Figure 9:
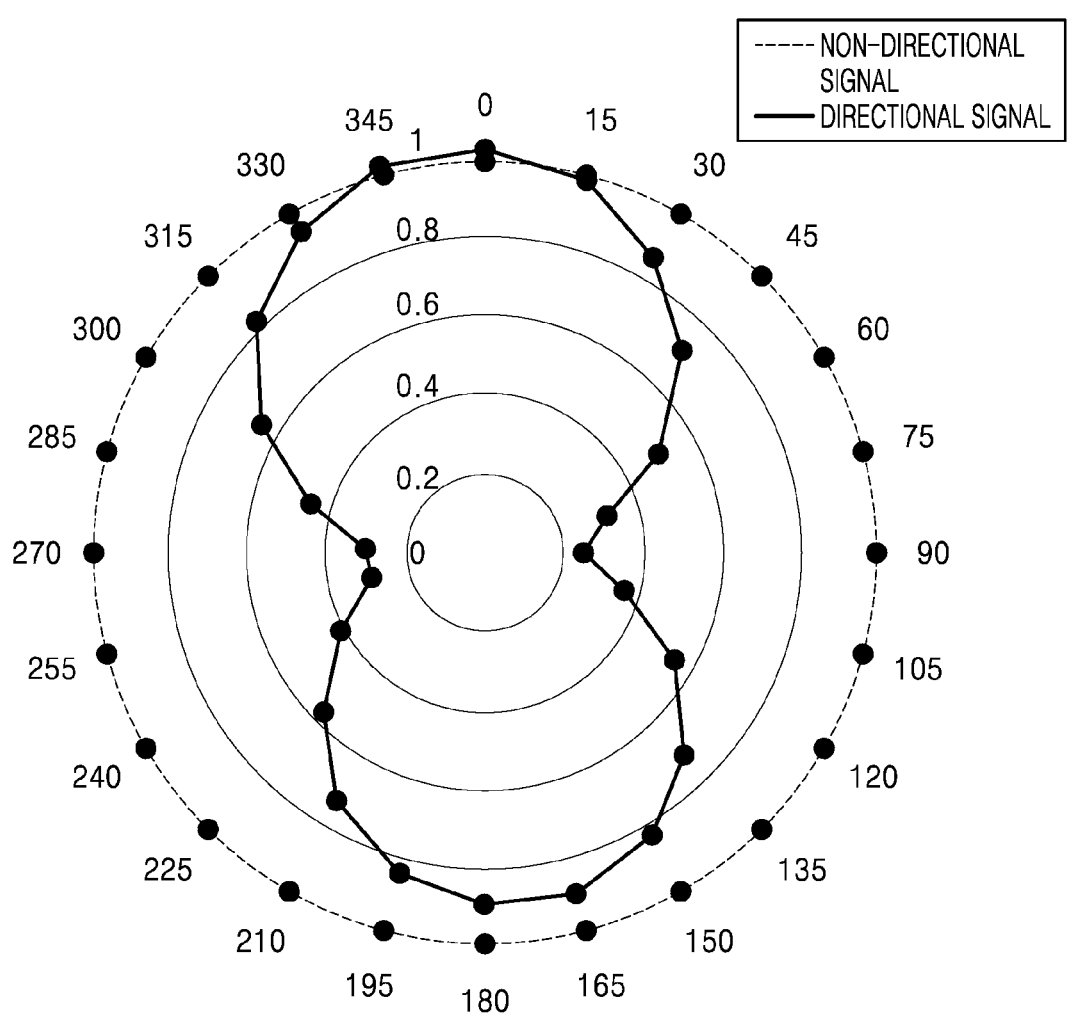
FIG. 9 is a graph showing a result of measuring directivity patterns of a user microphone and an ambient microphone, according to an example embodiment.

FIG. 9 is a graph showing a result of measuring directivity patterns of a user microphone and an ambient microphone according to an example embodiment.

Referring to FIG. 9, it may be seen that the user microphone has a bi-directional signal pattern, and the ambient microphone has an omni-directional (or non-directional) signal pattern. For example, the user microphone may sense a sound transmitted from a 330° to 30° area (60° to 120° based on one plane formed by the user microphone) corresponding to a front plane (+z direction in FIG. 6), and sense a sound transmitted from a 150° to 210° area (240° to 300° based on one plane formed by the user microphone) corresponding to a rear plane (−z direction in FIG. 6). For example, the user's microphone may sense approximately 0.85 times the size of sound in the area of 30° (120° based on one plane formed by the user's microphone) compared to the area of 0° (90° based on one plane formed by the user's microphone).

The ambient microphone may sense sound transmitted from all directions in the surrounding 360° area.

The user's microphone may attenuate a sound received in a direction close to 90° or 270° (0° based on one plane formed by the user's microphone). Referring to FIG. 9, because the user microphone according to an example embodiment responds with a low sensitivity to a sound received in a direction in an angle range of 60° to 120°, the sound in the corresponding direction may be attenuated.

In FIG. 9 shows the results for only one frequency, as described above with reference to FIG. 7, because the user microphone may have uniform sensitivity to various frequencies, the results for various frequencies may also form a directivity pattern of a similar shape. For example, the various frequencies may be frequencies in an audible frequency region, and a directivity pattern having a similar shape may be formed with respect to the user microphone regardless of the high or low frequency.

Figure 10A:
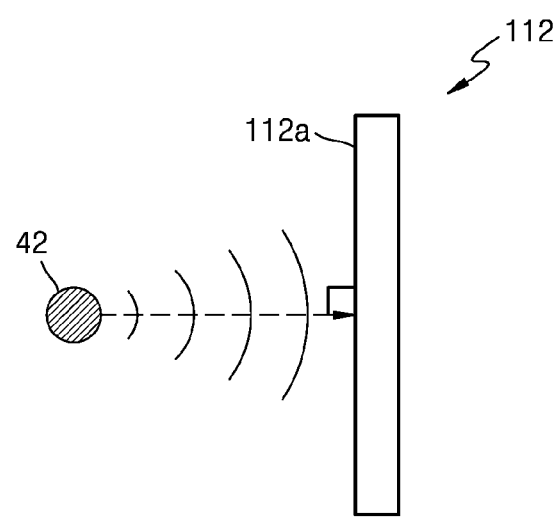
FIGS. 10A and 10B are diagrams illustrating an arrangement of a vibrator with respect to an utterance point of a user's voice.
Figure 10B:
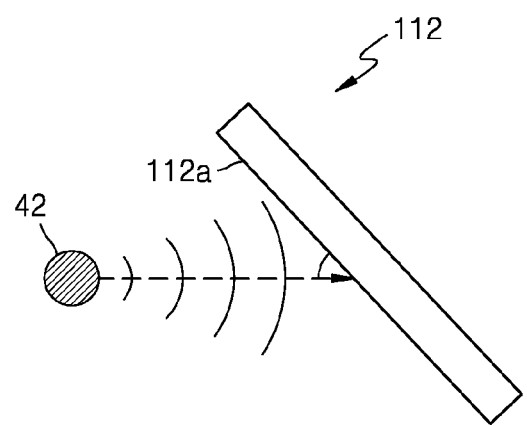

FIGS. 10A and 10B are diagrams illustrating an arrangement of a vibrator with respect to an utterance point of a user's voice.

Referring to FIGS. 10A and 10B, a user's voice propagated from an utterance point 42 of the user's voice may be received on one plane 112a formed by the vibrator 112.

As shown in FIG. 10A, when the propagation direction of the user's voice and the plane 112a formed by the vibrator 112 are orthogonal to each other, the vibrator 112 responds most sensitively, and the user's voice may be sensed the greatest. Accordingly, the user microphone may be disposed in the sound signal processing apparatus so that one plane 112a formed by the vibrator 112 (or a plurality of vibrators) is disposed in a direction corresponding to the utterance point 42 of the user's voice.

In other words, the user microphone may be arranged so that the plane 112a formed by the vibrator 112 (or a plurality of vibrators) and a direction from the utterance point 42 of the user's voice towards the one plane 112a correspond to each other (preferably 90°).

When an angle between the one plane 112a and the propagation direction of the user's voice is 90°, a sound may be sensed with the greatest sensitivity, but the angle may be difficult to be maintained at 90° due to various restrictions in process or use. For example, as shown in FIG. 10B, the direction of propagation of the user's voice and one plane 112a may form an angle of less than 90°. However, even in this case, as described above with reference to FIG. 9, the user microphone may sense the user's voice.

The user microphone may be disposed in the sound signal processing apparatus at an angle for securing flexibility in process and use and effectively sensing the user's voice. The user microphone may be disposed in the sound signal processing apparatus so that an angle formed between the one plane 112a formed by the vibrator 112 (or a plurality of vibrators) and a direction of the user's voice utterance point 42 toward the one plane 112a is in a range of 60° to 120°. As described above with reference to FIG. 9, even when the user microphone receives a sound at an angle of 60° or 120°, the user microphone may receive the sound with a size approximately 0.85 times the size when received at 90°. Accordingly, the angle in a range from 60° to 120° may be an angle sufficient to provide flexibility in process and use and to sense a user's voice.

In this way, when the user microphone is disposed to face the utterance point 42 of the user's voice, the user microphone may respond with a low sensitivity to an external sound generated at a location separated from the utterance point 42 of the user's voice. Accordingly, the user microphone may attenuate the external sound.

An example embodiment in which the user microphone is applied to a sound signal processing apparatus will be schematically described with reference to FIG. 17C.

Figure 11:
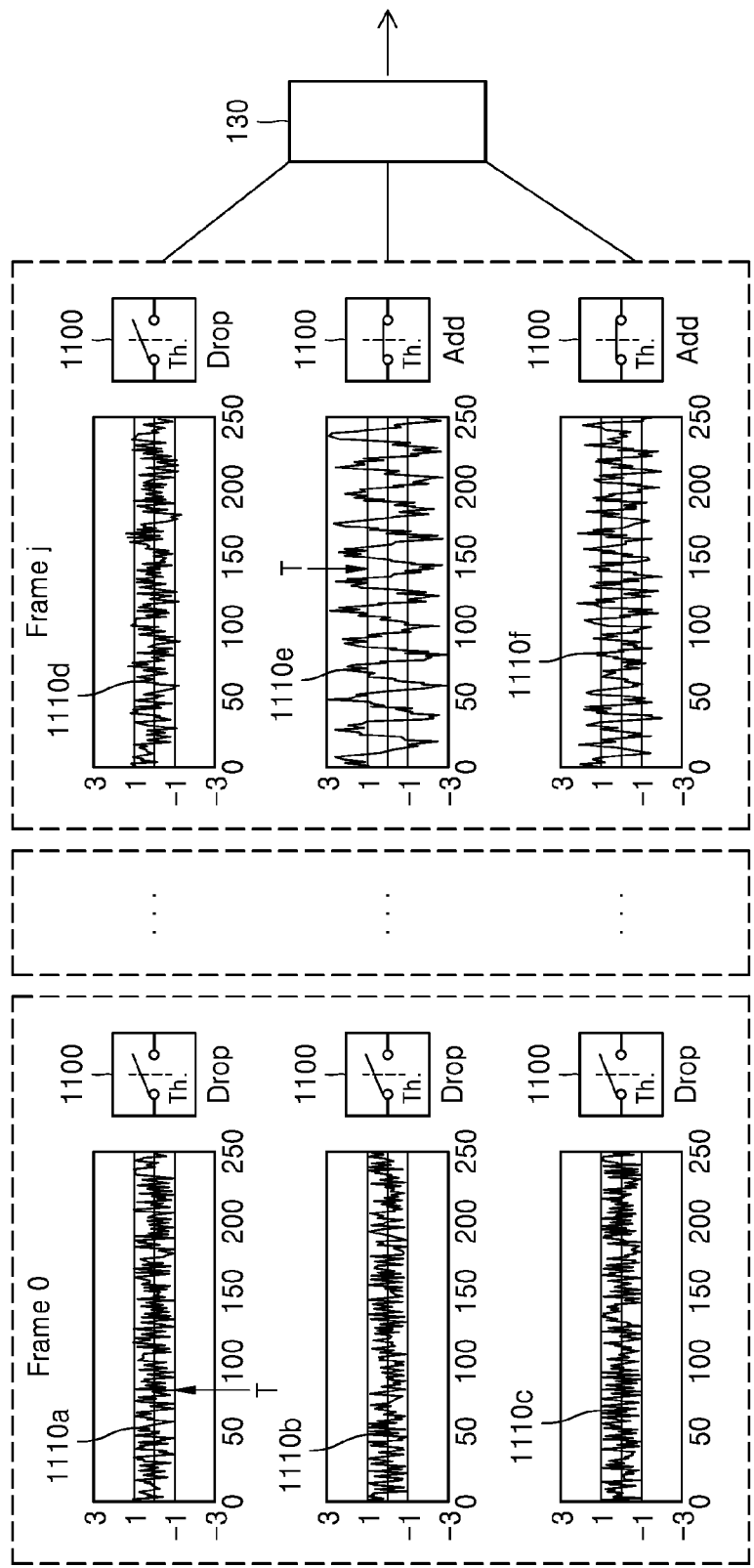
FIG. 11 is a diagram illustrating a sound adjustment process of a sound adjustment unit, according to an example embodiment.

FIG. 11 is a diagram illustrating a sound adjustment process of a sound adjustment unit according to an example embodiment.

FIG. 11 shows electrical sound signal frames 1110a to 1110f generated by three vibration structures that sense different frequency bands in each of two time frames. Each of the electrical sound signal frames 1110a to 1110f shows sound waveforms in a time domain. The sound signal frames are input to sound control units 1100, and each of the sound control units 1100 may be included in each of vibration structures or in a user's microphone.

The sound control unit 1100 of the user's microphone may determine an electrical signal to be attenuated from among the electrical signals generated by the vibration structures based on a threshold value. The sound control unit 1100 may attenuate the determined electrical signal. Here, the electrical signal to be attenuated may be a signal corresponding to an external sound. As the electrical signal corresponding to the external sound is attenuated by the sound control unit 1100, the user's voice may be maximized.

"Frame 0" indicates a sound signal frame measured at a first time interval. "Frame j" indicates a sound signal frame measured in a j-th time interval after the first time interval. The first to third sound signal frames 1110a to 1110c are frames measured in the same time period (the first time period), and the fourth to sixth sound signal frames 1110d to 1110f are also frames measured in the same time period (the j-th time period).

The first and fourth sound signal frames 1110a and 1110d may be in the same frequency band and may be input to the sound control unit 1100 through the same vibration structure. The second and fifth sound signal frames 1110*b* and 1110*e* may be in the same frequency band and may be input to the sound control unit 1100 through the same vibration structure. The third and sixth sound signal frames 1110*c* and 1110*f* may be in the same frequency band and may be input to the sound control unit 1100 through the same vibration structure. The frequency bands of the first and fourth sound signal frames 1110*a* and 1110*d*, the frequency bands of the second and fifth sound signal frames 1110*b* and 1110*e*, and the frequency bands of the third and sixth sound signal frames 1110*c* and 1110*f* are different from each other.

In FIG. 11, "Drop" indicates a case in which the sound control unit 1100 determines that an input sound signal is to be attenuated, and "Add" indicates a case in which the sound control unit 1100 does not attenuate the input sound signal.

Referring to FIG. 11, as in the case of the first to fourth sound signal frames 1110*a* to 1110*d*, when the intensity of the sound signal is less than or equal to a threshold value T or exceeds the threshold value T, but the degree of excess is less than or equal to a set value, the sound control unit 1100 may attenuate the corresponding sound signal (Drop).

On the other hand, as the fifth and sixth sound signal frames 1110*e* and 1110*f*, when the intensity of the sound signal exceeds the threshold value T and the degree of excess exceeds a set value, the sound control unit 1100 may not attenuate the corresponding sound signal (Add).

The sound control unit 1100 may include a switch and an attenuator (or an attenuator circuit). When the input sound signal exceeds the threshold value T, the sound control unit 1100 may turn on the switch to pass the input sound signal to the attenuator, and the attenuator may reduce the power of the input sound signal. The attenuator may include resistors that are connected to form a voltage divider. When the input sound signal is less than or equal to the threshold value T, the sound control unit 1100 may turn off the switch to block the input sound signal from flowing into the attenuator.

An output result of the sound control unit 1100 may be transmitted to the processor 130 through, for example, an amplifying unit.

Figure 12:
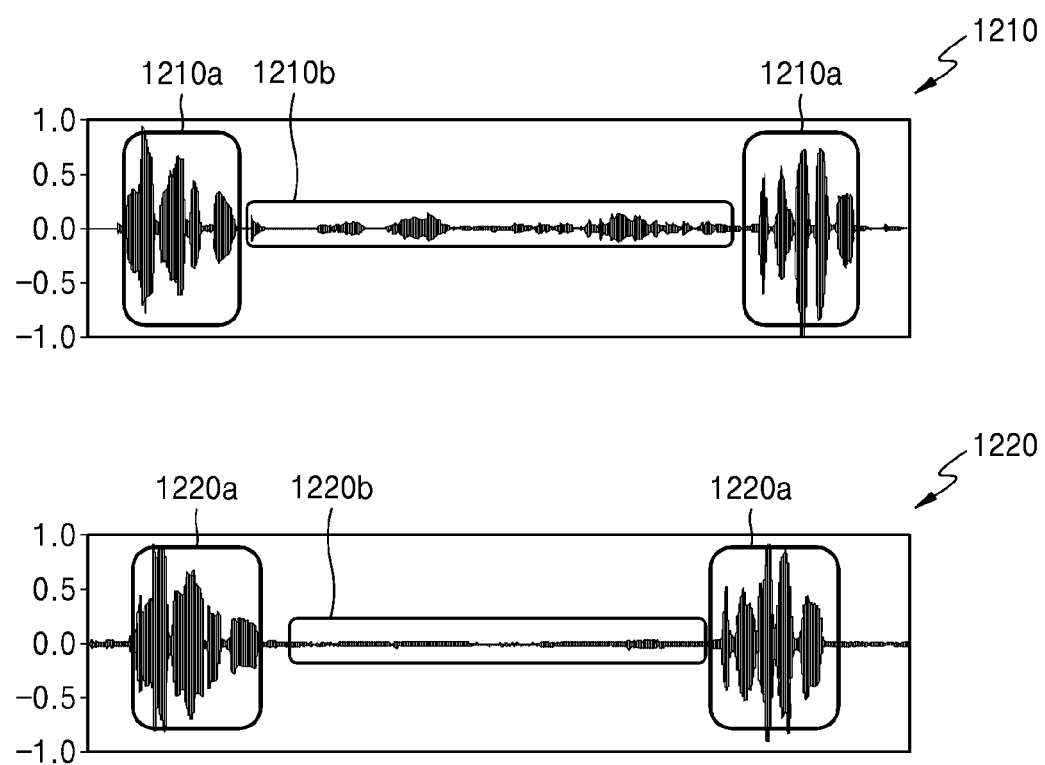
FIG. 12 is a diagram illustrating a user voice signal generated from a user microphone, according to an example embodiment.

FIG. 12 is a diagram illustrating a user voice signal generated from a user microphone according to an example embodiment.

Referring to FIG. 12, a first graph 1210 showing a result of sensing the user's voice by the method according to the comparative example of FIG. 5 and a second graph 1220 showing a result of sensing the user's voice by the user's microphone are shown.

The first graph 1210 shows a result of attenuating an external sound by using a plurality of ambient microphones according to the comparative example of FIG. 5. In the first graph 1210, a signal 1210*a* corresponding to a user's voice and a signal 1210*b* corresponding to an external sound are shown. It is confirmed that the signal 1210*b* corresponding to the external sound is attenuated than the signal 1210*a* corresponding to the user's voice, but it is confirmed that enough signal remains to allow the signal to be sensed.

The second graph 1220 represents a user voice signal generated by the user's microphone that attenuates an external sound signal. In the first graph 1220, a signal 1220*a* corresponding to a user's voice and a signal 1220*b* corresponding to an external sound are shown. In the second graph 1220, it is confirmed that the signal 1220*b* corresponding to the external sound is significantly attenuated. In the second graph 1220, it is confirmed that the signal 1220*b* corresponding to the external sound is attenuated to a level close to silence, which is difficult to be sensed.

The user's microphone may attenuate an external sound through arrangement toward a point of origin of the user's voice based on the directivity of the vibrating structures. Alternatively, the user's microphone may attenuate the external sound by attenuating some of the signals generated by the vibration structures based on a threshold value. As a result, the user's microphone may attenuate an external sound signal and generate a user voice signal by using one or both of the two methods described above.

Figure 13:
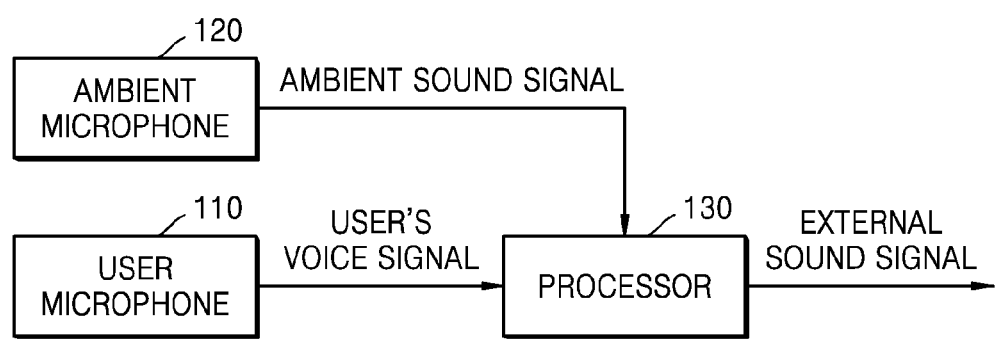
FIG. 13 is a block diagram for describing a difference calculation method according to an example embodiment.

FIG. 13 is a block diagram for describing a method of calculating a difference according to an example embodiment.

Referring to FIG. 13, a whole sound signal generated from the ambient microphone 120 and a user voice signal generated from the user microphone 110 may be input to the processor 130. The processor 130 may generate an external sound signal through an operation on the input signals.

Because the whole sound includes the external sound and the user's voice, a whole sound signal corresponding to the whole sound may include a signal corresponding to the external sound and a signal corresponding to the user's voice. The whole sound signal may be a signal from which no sound of any kind is attenuated or emphasized. The user voice signal may be a signal from which the external sound is attenuated from the whole sound by sensing the user's voice with a high sensitivity and sensing the external sound with a low sensitivity.

Accordingly, the processor 130 may generate a signal from which a signal corresponding to the user's voice is attenuated from the whole sound signal and a signal corresponding to the external sound is maintained by differentially calculating the user voice signal from the whole sound signal. In this way, the processor 130 may generate an external sound signal in which a signal corresponding to the external sound is emphasized.

Figure 14:
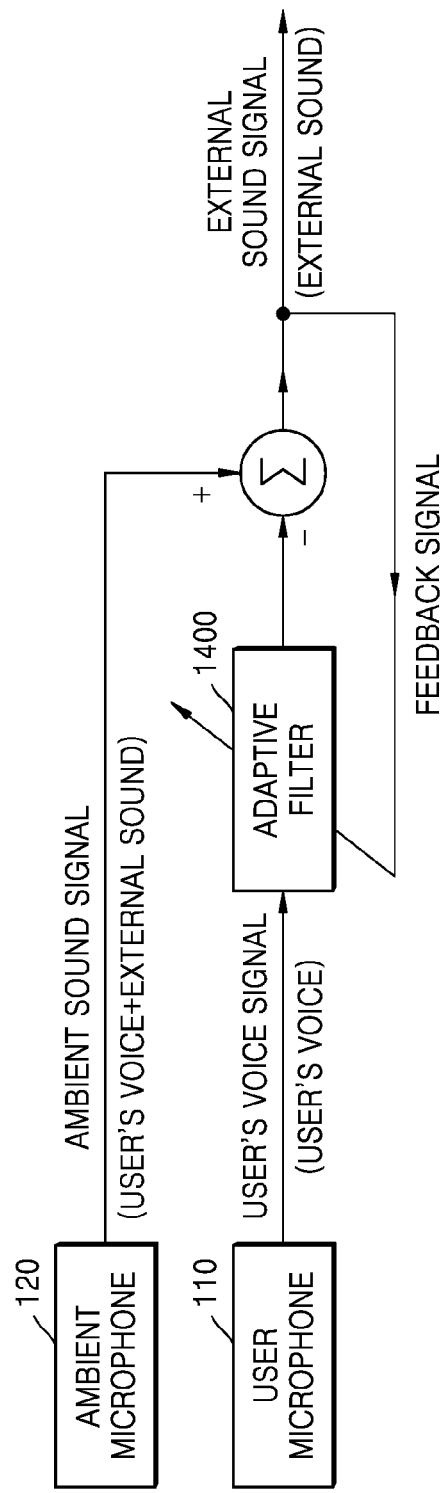
FIG. 14 is a block diagram for explaining an example of the difference calculation method of FIG. 13.

FIG. 14 is a block diagram for explaining an example of the method of calculating the difference of FIG. 13.

Referring to FIG. 14, a user voice signal generated from the user microphone 110 may be input to an adaptive filter 1400. An output signal of the adaptive filter 1400 may be differentially calculated from a whole sound signal generated from the ambient microphone 120, and a feedback signal which is a signal resulted from the differential calculation may be input to the adaptive filter 1400. As a result of differentially calculating an output signal of the fed back adaptive filter 1400 from the whole sound signal, an external sound signal may be finally generated.

The adaptive filter 1400 may adjust parameters for combining the ambient sound signal and the user's voice signal, based on the feedback signal. Here, the parameters may be adjusted so that the user's voice is attenuated from the whole sound signal as a result of the differential calculation. The adaptive filter 1400 may be operated according to various algorithms, for example, a least squares mean (LMS) algorithm for minimizing an error signal, a filtered-X LMS (FXLMS) algorithm, a filtered-error LMS (FELMS) algorithm, steepest descent algorithm, or a recursive least squares (RLS) algorithm. The parameters may include parameters relating to, for example, a correlation coefficient between signals, a delay of signals, or an amplitude of signals. The correlation coefficient may include a Spearman correlation coefficient, a Cronbach's alpha coefficient, or a Pearson correlation coefficient.

The processor may generate an external sound signal through an operation on the input signals. As a user voice signal is input to the adaptive filter 1400, the processor may generate a feedback signal by differentially calculating a signal output from the adaptive filter 1400 from all sound signals. The processor may control the adaptive filter 1400 to adjust parameters by inputting the feedback signal to the adaptive filter 1400. The processor may generate an external sound signal from which a signal corresponding to the user's voice is attenuated by differentially calculating the output signal from the adaptive filter 1400, in which parameters are adjusted as the feedback signal is applied, from the whole sound signal.

In another example embodiment, the sound signal processing apparatus may perform a differential calculation through a neural network operation without using the adaptive filter 1400. For example, the sound signal processing apparatus may perform a differential calculation through a convolution neural network (CNN) operation, a deep neural network (DNN) operation, or a recurrent neural network (RNN) operation. However, the type of neural network employed in the sound signal processing apparatus is not limited thereto.

Figure 15:
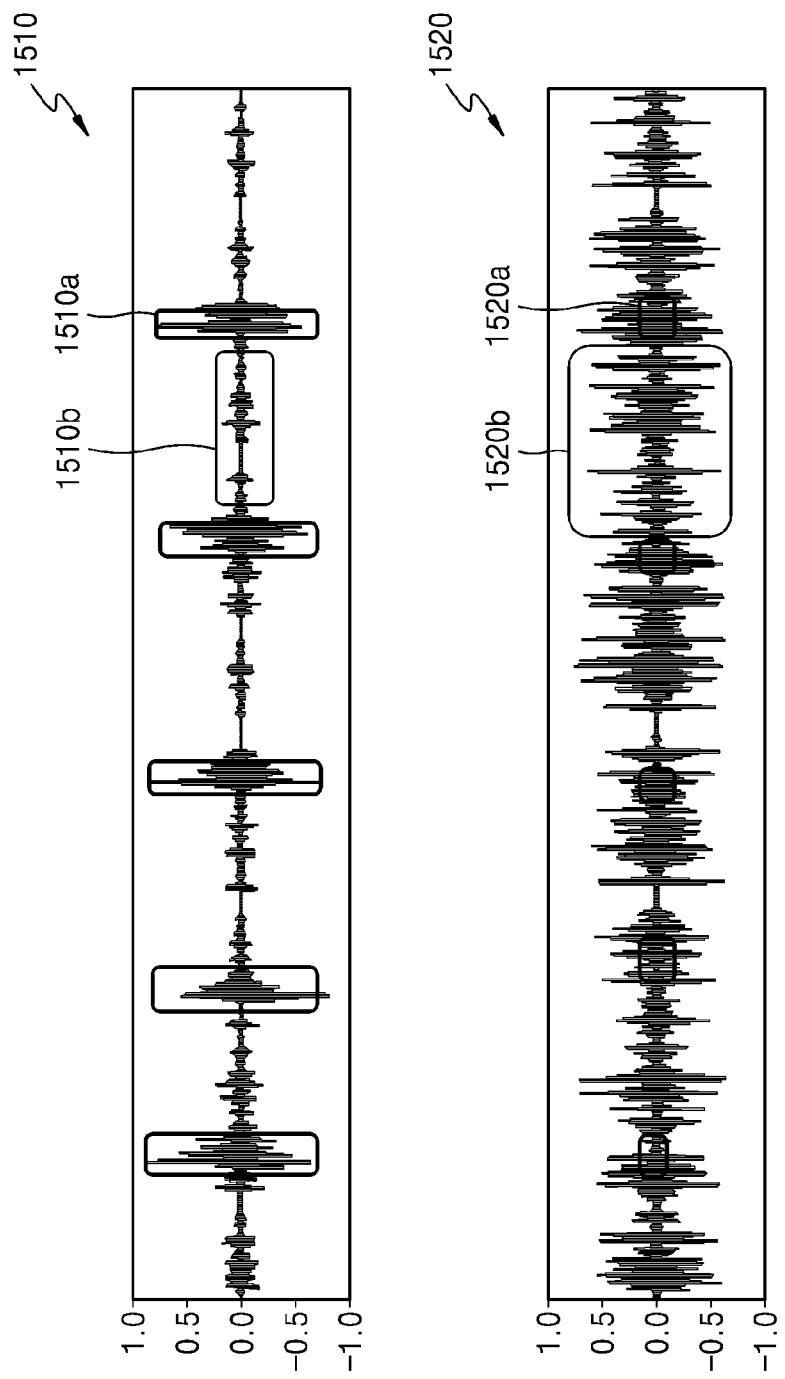
FIG. 15 is a diagram illustrating an external sound signal according to an example embodiment.

FIG. 15 is a diagram illustrating an external sound signal according to an example embodiment.

Referring to FIG. 15, a first graph 1510 showing a sound signal output by the method according to the comparative example of FIG. 5 and a second graph 1520 showing an external sound signal generated by the sound signal processing apparatus are shown. In the first graph 1510, a signal 1510*b* corresponding to an external sound and a signal 1510*a* corresponding to a user's voice are shown. In the second graph 1520, a signal 1520*b* corresponding to an external sound and a signal 1520*a* corresponding to a user's voice are also shown.

The first graph 1510 represents a sound signal output by using a plurality of ambient microphones according to the comparative example of FIG. 5. It is confirmed that the signal 1510*a* corresponding to the user's voice started at a point close to the ambient microphone is emphasized and the signal 1510*b* corresponding to the external sound is attenuated. According to the first graph 1510, in the comparative example of FIG. 5, an external sound is not clearly sensed, and functions according to the external sound are also difficult to perform.

The second graph 1520 also represents an external sound signal generated by the sound signal processing apparatus. It is confirmed that the signal 1520*a* corresponding to the user's voice is attenuated despite the close proximity of the user's microphone and the ambient microphone to the utterance point of the user's voice. On the other hand, it is confirmed that the signal 1520*b* corresponding to the external sound is emphasized. According to the second graph 1520, the sound signal processing apparatus may clearly sense an external sound while excluding the user's voice, and accordingly, may perform a corresponding function in response to the external sound.

In the first graph 1510, the signal 1510*b* corresponding to the external sound was measured as −34.45 dB, and the signal 1510*a* corresponding to the user's voice was measured as −17.76 dB. In the second graph 1520, the signal 1520*b* corresponding to the external sound was measured as −19.98 dB, and the signal 1520*a* corresponding to the user's voice was measured as −25.41 dB. Accordingly, differences between the signals 1510*a* and 1520*a* corresponding to the user's voice and the signals 1510*b* and 1520*b* corresponding to the external sound are −16.69 dB in the first graph 1510 and 5.43 dB in the second graph 1520. These numerical values indicate the degree of emphasis of the external sound compared to the user's voice, and a difference between the numerical values in the first graph 1510 and the second graph 1520 is 22.12 dB. It is confirmed that the sound signal processing apparatus performs attenuation of the user's voice and emphasis of external sound by a value 22 dB greater than the case according to the comparative example of FIG. 5.

Figure 16A:
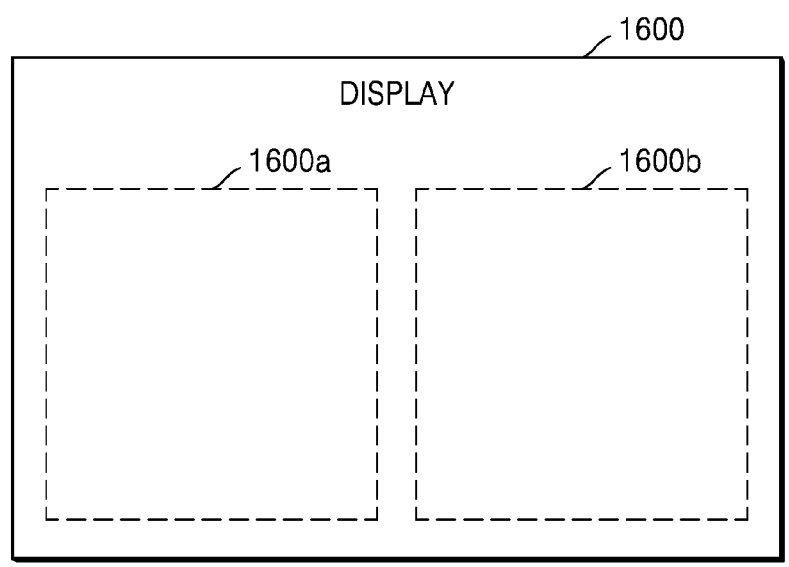
FIGS. 16A and 16B are diagrams illustrating displays according to embodiments.
Figure 16B:
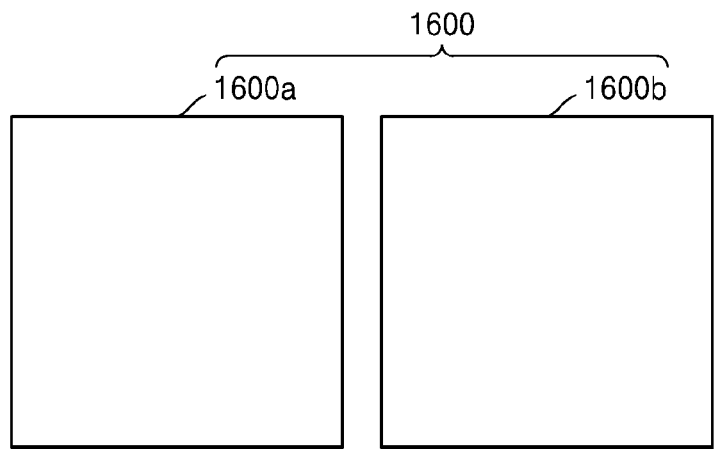

FIGS. 16A and 16B are diagrams illustrating displays according to embodiments.

The sound signal processing apparatus may further include a display 1600 that outputs visual information. The display 1600 may display various types of visual information in response to the control of a processor. The processor may perform a function corresponding to a user voice signal or a function corresponding to an external sound signal. The processor may display a result of performing the function on the display 1600. When the processor performs both a function corresponding to a user voice signal and a function corresponding to an external sound signal, the performance result of each of the performed functions may be displayed on different regions of the display 1600.

Referring to FIG. 16A, the display 1600 may include a first region 1600*a* and a second region 1600*b* within one frame. For example, the display 1600 may display a result of performing a function corresponding to a user voice signal in the first region 1600*a*, and a result of performing a function corresponding to an external sound signal in the second region 1600*b*.

Referring to FIG. 16B, the display 1600 may include a first region 1600*a* and a second region 1600*b* formed as individual frames. For example, the display 1600 may display a result of performing a function corresponding to a user voice signal in the first region 1600*a*, and a result of performing a function corresponding to an external sound signal in the second region 1600*b*.

Figure 17A:
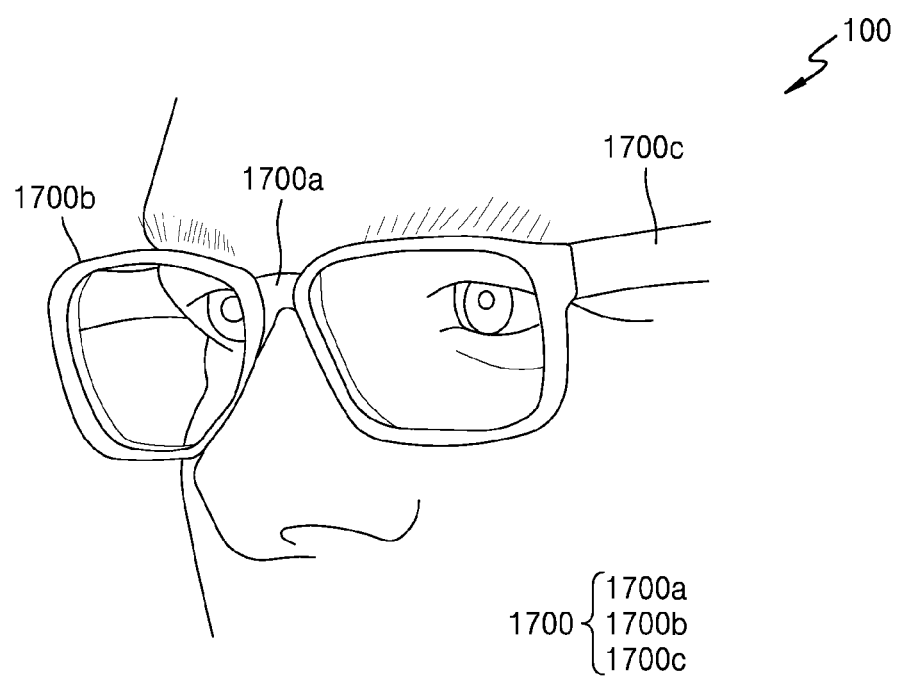
FIGS. 17A to 17C are diagrams illustrating embodiments in which the sound signal processing apparatus is a glasses-type wearable apparatus.
Figure 17B:
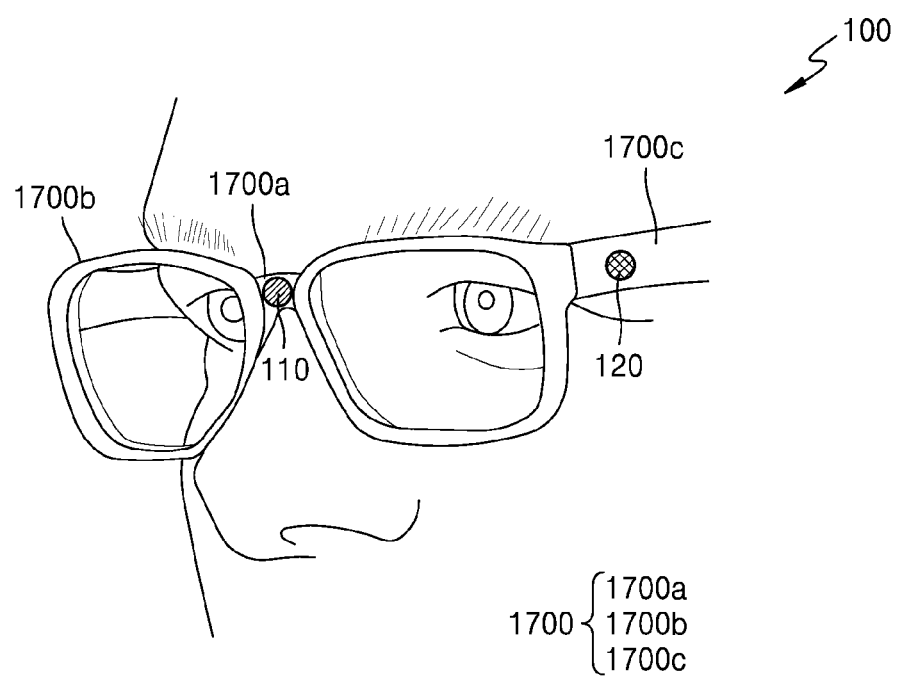
Figure 17C:
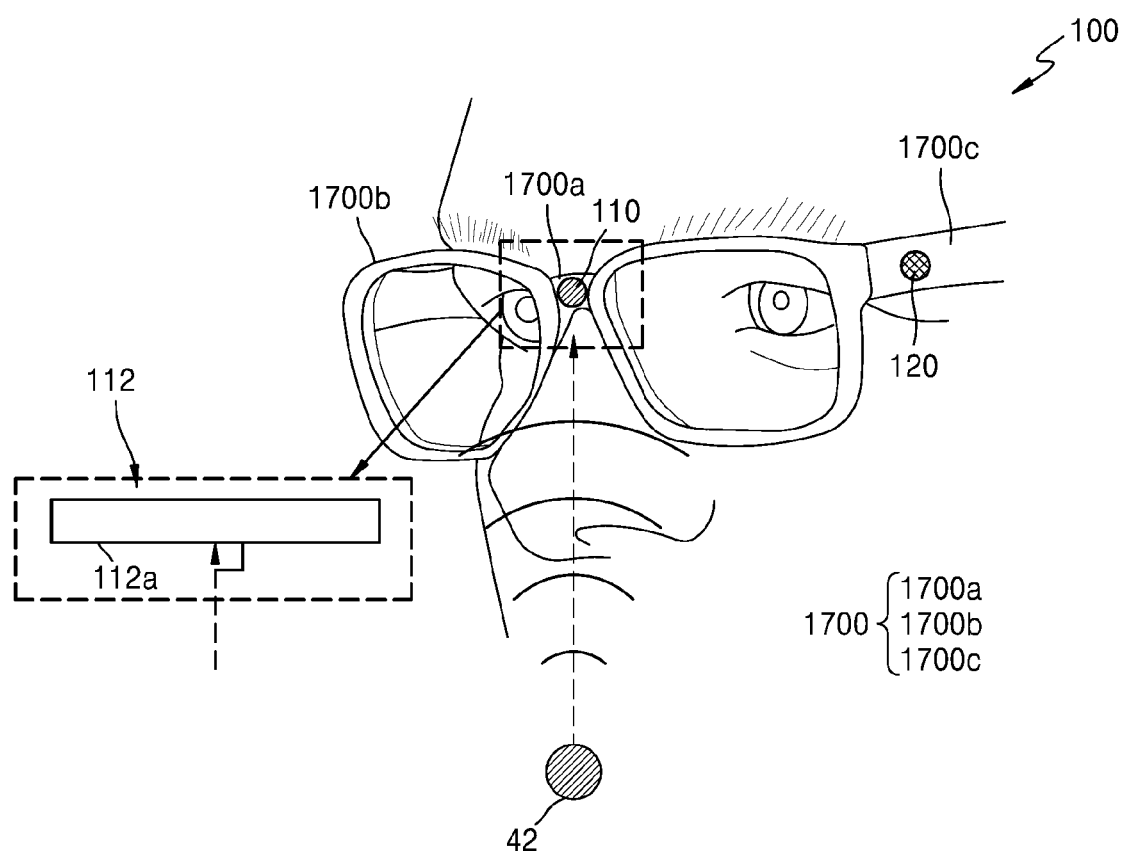

FIGS. 17A to 17C are diagrams illustrating embodiments in which the sound signal processing apparatus is a glasses-type wearable apparatus.

Referring to FIG. 17A, the sound signal processing apparatus 100 is a glasses-type wearable apparatus and may include a glasses frame 1700. The glasses frame 1700 may include a glasses bridge 1700*a*, a glasses frame 1700*b*, and a glasses leg 1700*c*.

A user microphone and an ambient microphone may be disposed on the glasses frame 1700. The user microphone and the ambient microphone may be disposed in various positions of the glasses frame 1700 according to the sound to be received. For example, the user's microphone may be disposed on the glasses bridge 1700*a* or the glasses frame 1700*b* to receive the user's voice at a closer position. Also, the ambient microphone may be disposed on the glasses frame 1700*b* or the glasses leg 1700*c*.

In FIG. 17A, although it shows that the sound signal processing apparatus 100 is a glasses-type wearable apparatus, this is only an example, and the sound signal processing apparatus 100 is in the form of a watch or bracelet worn on a wrist, in the form of a necklace worn on the neck, or in various types of wearable devices, such as earphones and headphones worn on the ears. The sound signal processing apparatus 100 may correspond to any wearable apparatus without limitation as long as it is wearable.

Referring to FIG. 17B, the user microphone 110 is disposed on the glasses bridge 1700*a* of the sound signal processing apparatus 100 and the ambient microphone 120 is disposed on the glasses leg 1700*c* of the sound signal processing apparatus 100.

Because the utterance point of a user's voice corresponds to a user's mouth or lips, the user's microphone 110 may be disposed on the glasses bridge 1700*a* to correspond to the utterance point. The ambient microphone 120 may be disposed on the glasses leg 1700c so as to more effectively receive an external sound in a lateral direction of the user and to be far from an utterance point of the user's voice. However, as described above, microphones may be disposed at various locations within the glasses frame 1700.

Referring to FIG. 17C, it is shown that a user's voice is propagated from the utterance point 42 of the user's voice to the user's microphone 110.

The utterance point 42 of the user's voice may be a position corresponding to the user's mouth or lips. The user's voice is propagated to the user's microphone 110 and may be received on the one plane 112a formed by the vibrator 112 of the user's microphone 110. Here, when the user's voice is propagated orthogonal to the one plane 112a formed by the vibrator 112, it may be sensed with the greatest sensitivity by the user's microphone 110.

Accordingly, as shown in FIG. 17C, the user's microphone 110 may be disposed in the sound signal processing apparatus 100 so that a direction from the utterance point 42 of the user's voice to the one plane 112a is vertical. When an outsider's voice is received from the front or side of the user, because it is received in a direction parallel to the one plane 112a of the user's microphone 110, the outsider's voice may be sensed with the lowest sensitivity or may not be sensed by the user's microphone 110. Due to this arrangement, the user's microphone 110 may attenuate an external sound and emphasize the user's voice.

However, because it is difficult to maintain a vertical direction due to various restrictions in process or use, the user microphone 110 may be disposed so that an angle between the direction of the user's voice and the one plane 112a is in a range of 60° to 120°. As described above with reference to FIGS. 9 and 10B, even when the user's microphone 110 is disposed at the angle described above, the user's voice may be effectively sensed, and thus, an external sound signal from which the user's voice is attenuated may be generated.

Figure 18A:
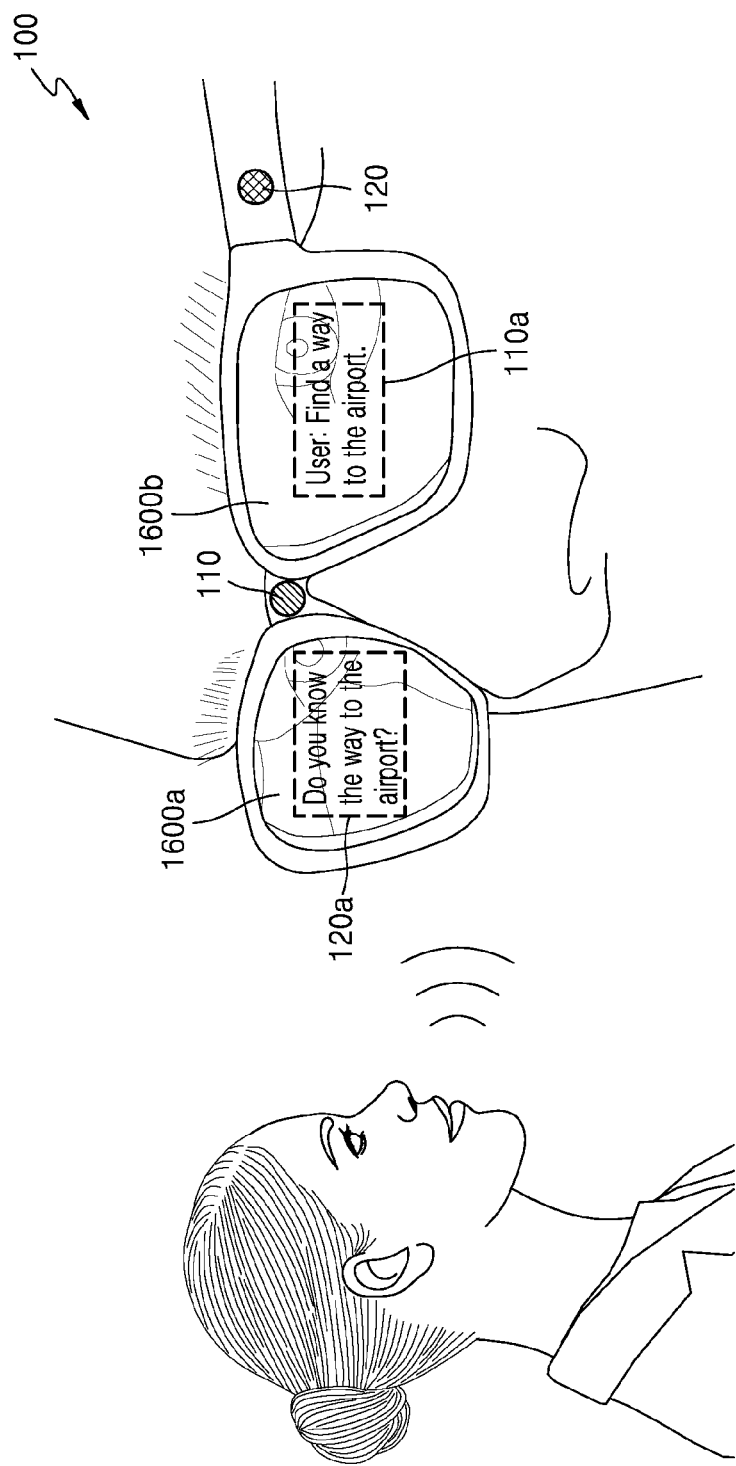
FIGS. 18A and 18B are diagrams illustrating embodiments in which a result of performing a function is displayed on a display.
Figure 18B:
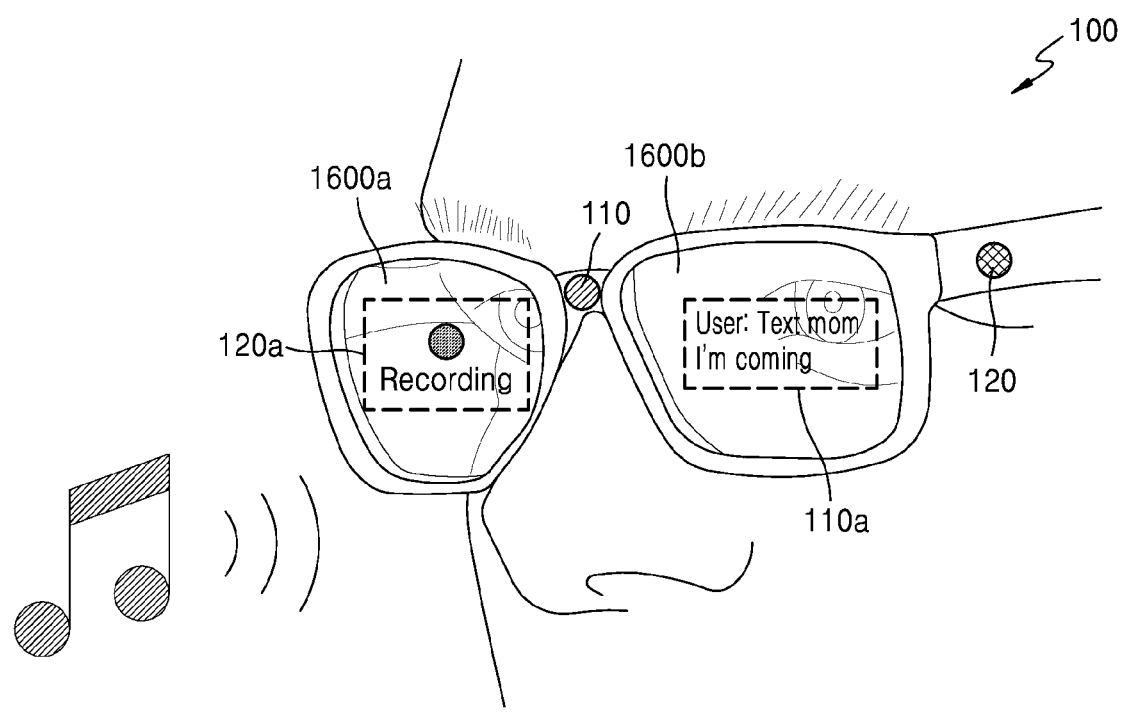

FIGS. 18A and 18B are diagrams illustrating embodiments in which a result of performing a function is displayed on a display.

Referring to FIGS. 18A and 18B, the display may include a first region 1600a and a second region 1600b, and different visual information may be displayed in each region.

As shown in FIG. 18A, the user microphone 110 and the ambient microphone 120 may receive an external voice, which is an external sound, and simultaneously receive a user's voice. Because the external voice is received from the front direction of the user's microphone 110, it may be received at an angle parallel to or close to parallel to one plane formed by a vibrator. Accordingly, the user's microphone 110 may attenuate an outsider's voice.

The sound signal processing apparatus 100 may generate a user voice signal by using the user microphone 110, and may generate an external sound signal from which the user's voice is attenuated through a differential calculation between the signals. The sound signal processing apparatus 100 may display visual information 120a corresponding to the external sound signal in the first region 1600a, and display visual information 110a corresponding to the user voice signal in the second region 1600b.

In the embodiment of FIG. 18A, the sound signal processing apparatus 100 may recognize an outsider's voice, convert it into text, and display it in the first region 1600a. For example, when the outsider is a foreigner, the sound signal processing apparatus 100 may perform translation on the received outsider's voice, and then, display the translation result in the first region 1600a. At the same time, the sound signal processing apparatus 100 may perform a function corresponding to the user's voice and display the execution result in the second region 1600b.

As shown in FIG. 18B, the user microphone 110 and the ambient microphone 120 may receive an external sound (e.g., music, etc.) from a sound output apparatus and simultaneously receive a user's voice. Because the external sound is received from a front direction of the user's microphone 110, it may be received at an angle parallel to or close to parallel to one plane formed by a vibrator. Accordingly, the user's microphone 110 may attenuate an external sound.

The sound signal processing apparatus 100 may generate a user voice signal by using the user microphone 110, and may generate an external sound signal from which the user's voice is attenuated through a differential calculation between the signals. The sound signal processing apparatus 100 may display visual information 120a corresponding to the external sound signal in the first region 1600a, and display visual information 110a corresponding to the user voice signal in the second region 1600b.

In the embodiment of FIG. 18B, the sound signal processing apparatus 100 may record or videotape an external sound signal from which the user's voice is attenuated. Since the sound signal processing apparatus 100 may effectively attenuate the user's voice even when the user's voice is received, only an external sound may be recorded. For example, the sound signal processing apparatus 100 may display an indication that an external sound is being recorded on the first region 1600a. At the same time, the sound signal processing apparatus 100 may perform a function corresponding to the user's voice and display the execution result in the second region 1600b.

Various functions performed based on the received signals described above are merely examples and may be variously modified and implemented.

Figure 19:
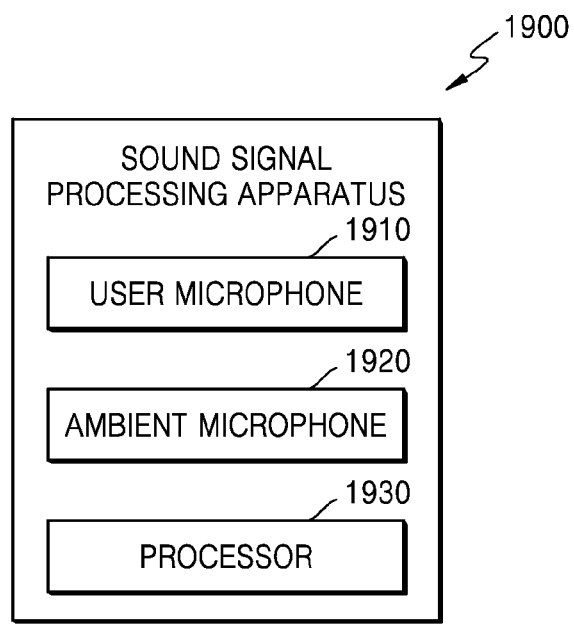
FIG. 19 is a block diagram illustrating a configuration of a sound signal processing apparatus according to another example embodiment.

FIG. 19 is a block diagram illustrating a configuration of a sound signal processing apparatus 1900 according to another example embodiment.

Referring to FIG. 19, the sound signal processing apparatus 1900 may include a user microphone 1910, an ambient microphone 1920, and a processor 1930. In the sound signal processing apparatus 1900 illustrated in FIG. 19, only components related to the present embodiments are illustrated. Accordingly, it is apparent to those skilled in the art that general-purpose components other than those shown in FIG. 19 may further be included in the sound signal processing apparatus 1900. The user microphone 1910 of FIG. 19 corresponds to the user microphone of FIG. 1, and the ambient microphone 1920 of FIG. 19 has a structure and operation method different from the ambient microphone of FIG. 1 and the ambient microphone of FIG. 5, and may have a structure similar to that of the user microphone of FIG. 1.

In the sound signal processing apparatus 1900 according to the embodiment of FIG. 19, unlike the sound signal processing apparatus according to the embodiment of FIG. 1, the ambient microphone 1920 may have a structure corresponding to the user microphone 1910. The ambient microphone 1920 may include a plurality of vibration structures like the user microphone 1910, and may be arranged in the sound signal processing apparatus 1900 in consideration of the propagation direction of the received sound.

The user microphone 1910 forms a first plane and may receive a sound through the first plane. The user microphone 1910 may be arranged in the sound signal processing apparatus 1900 so that the first plane is arranged in a direction corresponding to an utterance point of the user's voice. Due to this arrangement, the user microphone 1910 may generate a user voice signal from which an external sound is attenuated.

The ambient microphone 1920 forms a second plane and may receive sound through the second plane. The ambient microphone 1920 may be arranged in the sound signal processing apparatus 1900 so that the second plane is arranged in a direction different from the direction in which the user microphone is arranged. Therefore, because the ambient microphone 1920 is not arranged to correspond to an utterance point of the user's voice, in the ambient microphone 1920, a sound signal from which the user's voice is attenuated compared to the sound signal generated by the user microphone 1910 may be generated.

Also, the ambient microphone 1920 may be provided in the sound signal processing apparatus 1900 so that the second plane is arranged in a direction corresponding to the point where the external sound is generated. Due to the arrangement of the ambient microphone 1920, an external sound may be sensed with a high sensitivity and a user's voice may be sensed with a low sensitivity. Accordingly, the user's voice may be attenuated from a whole sound received by the ambient microphone 1920, and a first external sound signal that is a sound signal generated by the ambient microphone 1920 may be a signal from which the user's voice has been attenuated.

The processor 1930 may generate a second external sound signal by differentially calculating the user voice signal from the first external sound signal. Although the user's voice has already been attenuated and sensed in the first external sound signal, the processor 1930 may generate a second external sound signal from which the user's voice is further attenuated by differentially calculating the user voice signal of the user's microphone 1910 from the first external sound signal of the ambient microphone 1920.

Figure 20:
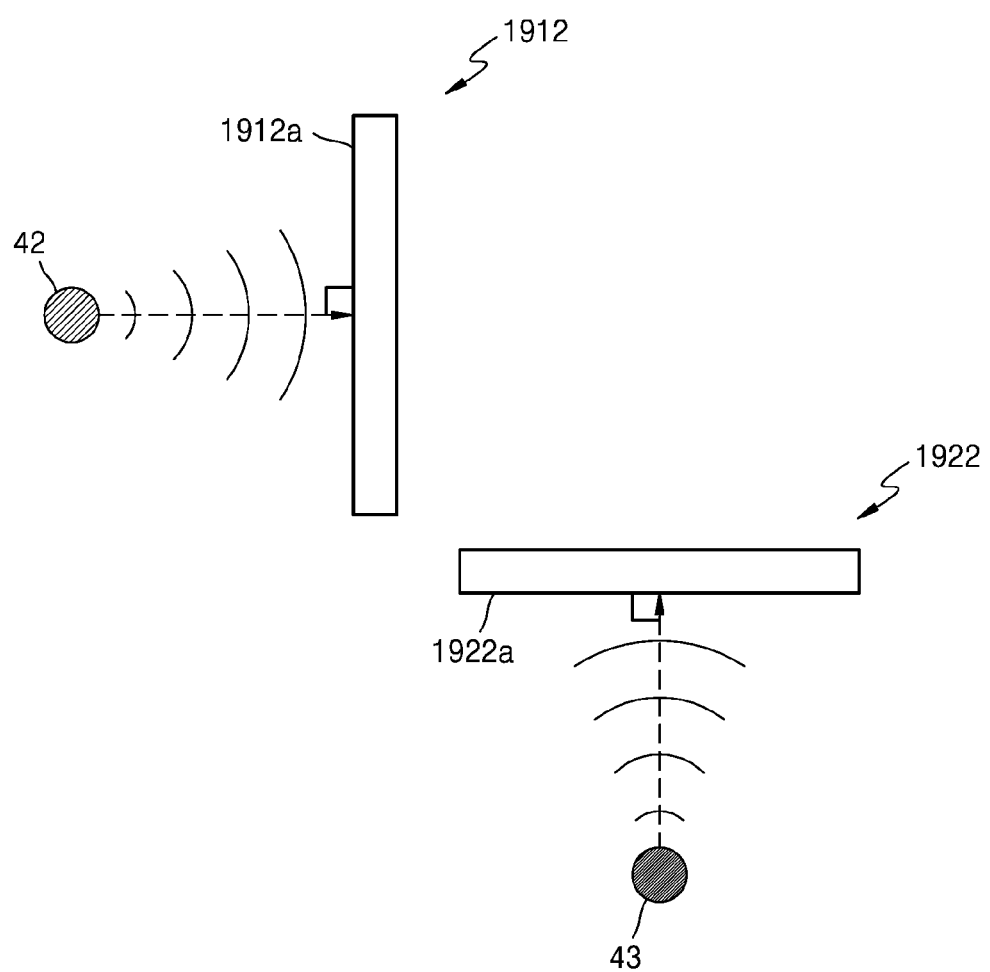
FIG. 20 is a diagram for explaining the arrangement of a user microphone and an ambient microphone, according to the embodiment of FIG. 19.

FIG. 20 is a diagram for explaining the arrangement of the user microphone 1910 and the ambient microphone 1920 according to the embodiment of FIG. 19.

Referring to FIG. 20, the user's voice propagated from an utterance point 42 of the user's voice may be received on a first plane 1912a formed by the vibrator 1912 of the user's microphone 1910. In addition, an external sound propagated from an external sound generating point 43 may be received by the second plane 1922a formed by the vibrator 1922 of the ambient microphone 1920.

As shown in FIG. 20, when the propagation direction of the user's voice and the first plane 1912a formed by the vibrator 1912 of the user's microphone 1910 are orthogonal to each other, the vibrator 1912 may respond most sensitively and the user's voice may be sensed the greatest. Accordingly, the user's microphone 1910 may be disposed in the sound signal processing apparatus so that the first plane 1912a formed by the vibrator 1912 (or a plurality of vibrators) is disposed in a direction corresponding to the utterance point 42 of the user's voice.

In other words, the user microphone 1910 may be arranged so that the first plane 1912a formed by the vibrator 1912 (or a plurality of vibrators) and a direction from the utterance point 42 of the user's voice toward the first plane 1912a correspond to each other (preferably, to form 90°). For example, the user microphone 1910 may be arranged in the sound signal processing apparatus so that an angle formed between the first plane 1912a formed by the vibrator 1912 (or a plurality of vibrators) and the direction from the utterance point 42 of the user's voice towards the first plane 1912a is in a range of 60° to 120°.

In addition, as shown in FIG. 20, when a propagation direction of an external sound and the second plane 1922a formed by the vibrator 1922 of the ambient microphone 1920 are orthogonal to each other, the vibrator 1922 may respond most sensitively, and the external sound may be sensed the greatest. Accordingly, the ambient microphone 1920 may be arranged in the sound signal processing apparatus so that the second plane 1922a formed by the vibrator 1922 (or a plurality of vibrators) is arranged in a direction corresponding to the external sound generating point 43.

In other words, the ambient microphone 1920 may be arranged so that the second plane 1922a formed by the vibrator 1922 (or a plurality of vibrators) and the direction from the external sound generating point 43 toward the second plane 1922a correspond to each other (preferably to form 90°). For example, in the ambient microphone 1920 may be arranged in the sound signal processing apparatus so that an angle formed between the second plane 1922a formed by the vibrator 1922 (or a vibrators) and the direction from the external sound generation point 43 toward the second plane 1922a is in a range of 60° to 120°.

As shown in FIG. 20, as the user microphone 1910 and the ambient microphone 1920 are disposed in directions corresponding to different points in the sound signal processing apparatus, the external sound is received at an angle away from 90° (or at an angle close to parallel) on the first plane 1912a of the user microphone 1910, and the user's voice is received at an angle away from 90° (or at an angle close to parallel) on the second plane 1922a of the ambient microphone 1920. Accordingly, an external sound may be sensed with a low sensitivity to the user's microphone 1910, and a user's voice may be sensed with a low sensitivity to the ambient microphone 1920. That is, the user microphone 1910 may generate a user voice signal from which an external sound is attenuated, and the ambient microphone 1920 may generate a first external sound signal from which the user's voice is attenuated.

As in the embodiment of FIGS. 17A to 17C, when the sound signal processing apparatus is a glasses-type wearable apparatus, the user's microphone may be arranged in the sound signal processing apparatus so that the first plane 1912a is arranged in a direction corresponding to the user's lips or oral cavity. The ambient microphone may be arranged in a direction different from the direction in which the user's microphone is arranged, and may be arranged in the sound signal processing apparatus so that the second plane 1922a is arranged in a direction corresponding to the front or side of the user.

Referring to the embodiment of FIG. 18A, a voice of an outsider, which is an external sound, may be received from the front of the user. When the second plane 1922a of the ambient microphone is arranged in a direction corresponding to the front of the user, which is the point where the external sound is generated, the voice of an outsider is sensed with a high sensitivity by the ambient microphone, but at the same time, is sensed with a low sensitivity by the user's microphone. In this case, because the ambient microphone senses an external sound with a high sensitivity, a first external sound signal from which the user's voice is attenuated may be generated.

Similarly in the embodiment of FIG. 18B, because an external sound (e.g., music, etc.) is received from the front of the user, when the second plane 1922a of the ambient microphone is arranged in a direction corresponding to the front of the user, which is the point where the external sound is generated, the ambient microphone may sense the external sound with a high sensitivity.

On the other hand, the direction in which the second plane 1922*a* of the ambient microphone is arranged is not limited to the front or side of the user, and may be arranged in various directions according to design.

Figure 21:
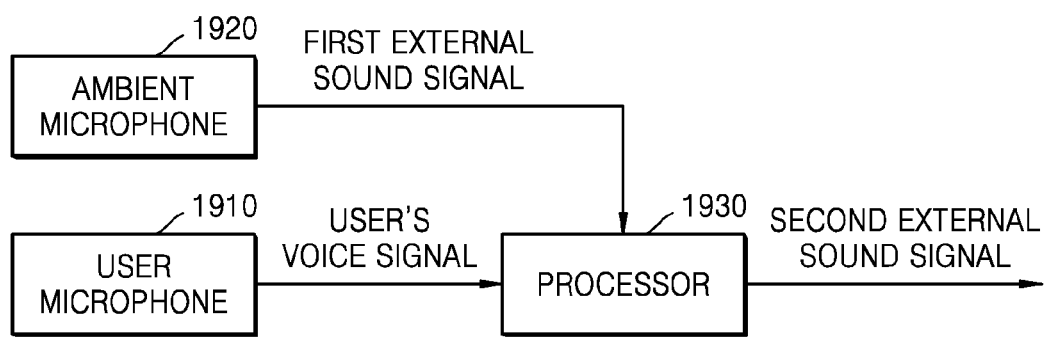
FIG. 21 is a block diagram for explaining a differential calculation method according to the embodiment of FIG. 19.

FIG. 21 is a block diagram for explaining a differential calculation method according to the embodiment of FIG. 19.

Referring to FIG. 21, a first external sound signal generated from the ambient microphone 1920 and a user voice signal generated from the user microphone 1910 may be input to the processor 1930. The processor 1930 may generate a second external sound signal through a calculation on the input signals.

The first external sound signal may be a signal from which the user's voice is attenuated from a whole sound by sensing the external sound with a high sensitivity and the user's voice with a low sensitivity. The user voice signal may be a signal from which the external sound is attenuated from the whole sound by sensing the user's voice with a high sensitivity and sensing the external sound with a low sensitivity.

The processor 1930 may generate a signal from which a signal corresponding to the user's voice in the first external sound signal is further attenuated and a signal corresponding to the external sound is maintained by differentially calculating the user voice signal from the first external sound signal.

The processor 1930 may perform a differential calculation between signals by using an adaptive filter or a neural network.

Figure 22:
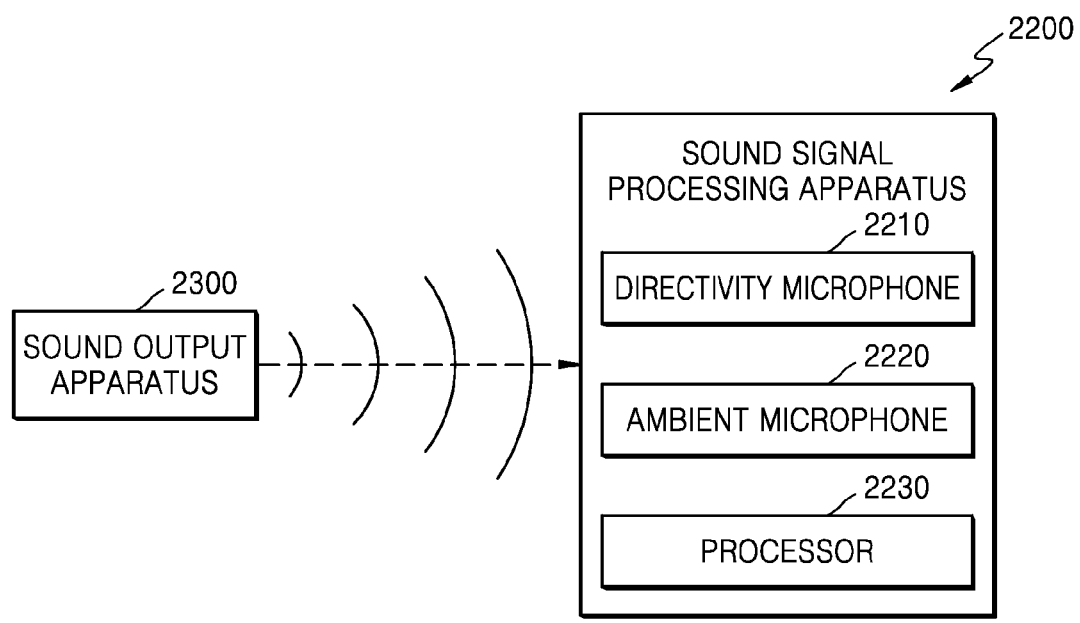
FIG. 22 is a block diagram illustrating a configuration of an sound signal processing apparatus according to another example embodiment.

FIG. 22 is a block diagram illustrating a configuration of a sound signal processing apparatus according to another example embodiment.

Referring to FIG. 22, the sound signal processing apparatus 2200 may include a directivity microphone 2210, an ambient microphone 2220, and a processor 2230. The sound signal processing apparatus 2200 may receive an output sound from a sound output apparatus 2300. In the sound signal processing apparatus 2200 illustrated in FIG. 22, only components related to the present embodiments are illustrated. Accordingly, it is apparent to those skilled in the art that other general-purpose components other than the components shown in FIG. 22 may further be included in the sound signal processing apparatus 2200. The directivity microphone 2210 of FIG. 22 may correspond to the user microphone of FIG. 1.

In the embodiment of FIG. 22, the sound signal processing apparatus 2200 is not worn by the user and may be arranged adjacent to the sound output apparatus 2300 or included in the sound output apparatus 2300. The output sound of the embodiment of FIG. 22 may correspond to the user's voice of the embodiment of FIG. 1.

In the embodiment of FIG. 1, the sound signal processing apparatus 2200 attenuates a user's voice generated at a nearby location through a differential calculation, however, in the embodiment of FIG. 22, the sound signal processing apparatus 2200 is located close to the sound output apparatus 2300, an output sound generated at a nearby location may be attenuated through a differential calculation. In the embodiment of FIG. 22, the sound signal processing apparatus 2200 generates an external sound from which an output sound is attenuated, but the external sound may include a user's voice. Accordingly, the sound output apparatus 2300 may generate an external sound signal from which an output sound is attenuated and a user's voice is emphasized while receiving the output sound.

The directivity microphone 2210 may receive a whole sound including a sound output from the sound output apparatus 2300 and an external sound generated from the outside of the sound output apparatus 2300. The directivity microphone 2210 may generate an output sound signal by attenuating an external sound from the whole received sound. The directivity microphone 2210 may be disposed in the sound signal processing apparatus 2200 so that one plane that receives the whole sound is arranged in a direction corresponding to a point of generation of the output sound. Due to the arrangement of the directivity microphone 2210, an output sound may be sensed with a high sensitivity and an external sound may be sensed with a low sensitivity. Accordingly, an external sound may be attenuated from the whole sound received by the directivity microphone 2210, and an output sound signal that is a sound signal generated by the directivity microphone 2210 may be a signal from which the external sound has been attenuated.

For example, the directivity microphone 2210 may be arranged so that an angle formed between a plane for receiving a sound and a direction towards the plane from a point of generating an output sound is in a range of 60° to 120°.

The ambient microphone 2220 may receive a whole sound and may generate an whole sound signal from the received whole sound. The processor 2230 may generate an external sound signal from which the output sound is attenuated by differentially calculating the output sound signal from the whole sound signal.

The sound signal processing apparatus 2200 of FIG. 22 differs only in the type of signal to be attenuated or emphasized, but the operation method and arrangement thereof correspond to the sound signal processing apparatus of FIG. 1, and thus redundant descriptions of the sound signal processing apparatus 2200 are herein omitted.

Figure 23:
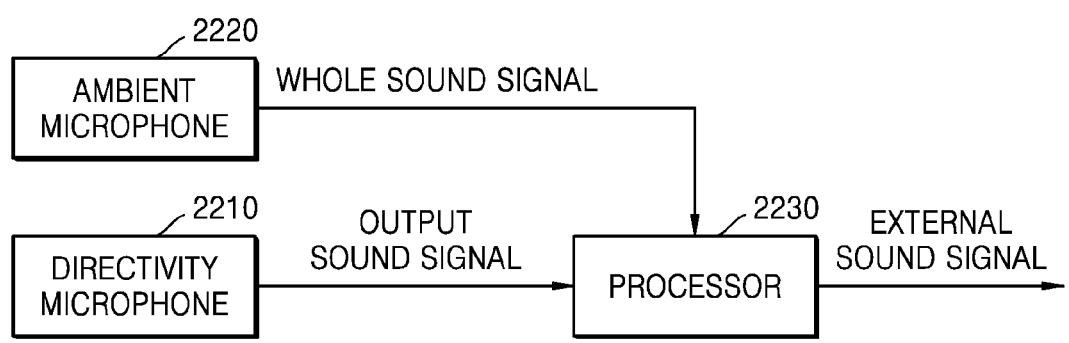
FIG. 23 is a diagram for explaining a differential calculation method according to the embodiment of FIG. 22.

FIG. 23 is a diagram for explaining a differential calculation method according to the embodiment of FIG. 22.

Referring to FIG. 23, a whole sound signal generated from the ambient microphone 2220 and an output sound signal generated from the directivity microphone 2210 may be input to the processor 2230. The processor 2230 may generate an external sound signal through a calculation on the input signals.

Because a whole sound includes an external sound and an output sound, the whole sound signal corresponding to the whole sound may include a signal corresponding to the external sound and a signal corresponding to the output sound. The external sound may include a user's voice. The whole sound signal may be a signal from which no sound of any kind is attenuated or emphasized. The output sound signal may be a signal from which the external sound is attenuated from the whole sound by sensing the output sound with a high sensitivity and the external sound with a low sensitivity.

Accordingly, the processor 2230 may generate a signal from which a signal corresponding to the output sound is attenuated from the whole sound signal and a signal corresponding to the external sound (or user voice) is maintained by differentially calculating the output sound signal from the whole sound signal. In this way, the processor 2230 may generate an external sound signal in which a signal corresponding to the external sound is emphasized.

The processor 2230 may perform a differential calculation between signals by using an adaptive filter or a neural network.

Figure 24:
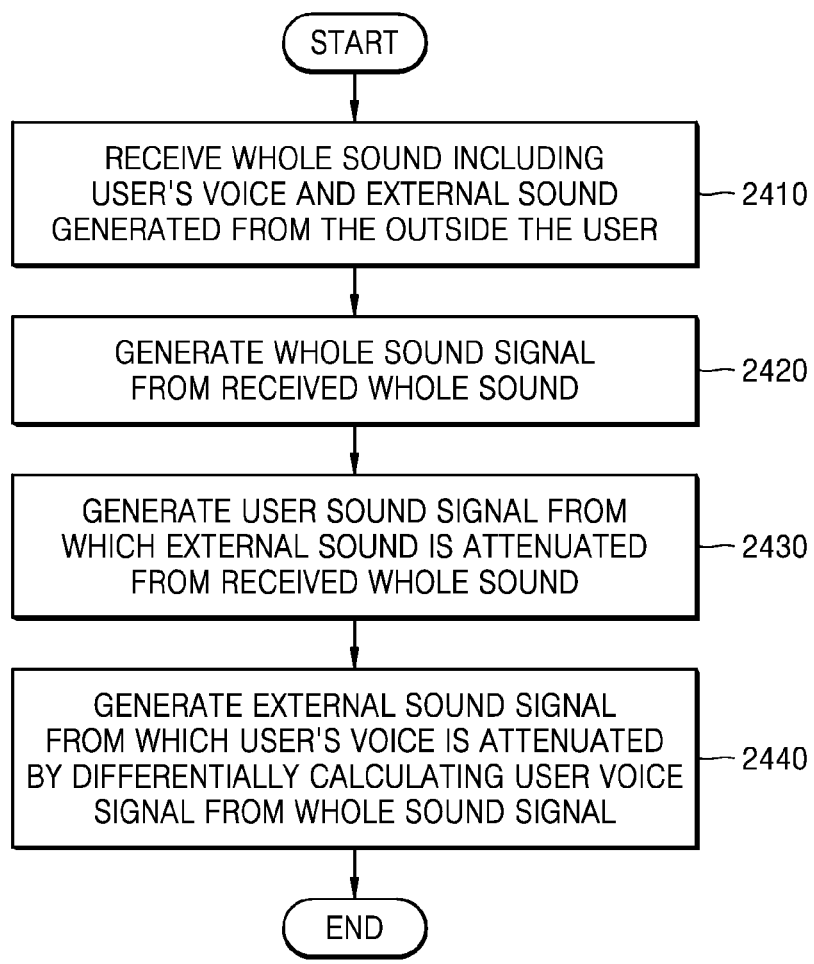
FIG. 24 is a flowchart illustrating a sound signal processing method according to an example embodiment.

FIG. 24 is a flowchart illustrating a method of processing a sound signal, according to an example embodiment.

Referring to FIG. 24, the method of processing a sound signal includes operations processed in time series by the sound signal processing apparatus shown in FIG. 1. Therefore, it may be seen that the above-described information regarding the sound signal processing apparatus with reference to FIG. 1 and the like is also applied to the method of FIG. 24 even if the content is omitted below.

In operation 2410, the sound signal processing apparatus may receive a whole sound including a user's voice and an external sound generated from an outside of the user.

In the sound signal processing apparatus, a plurality of vibration structures sensing sound of different frequency bands may vibrate in a direction orthogonal to one plane formed to receive the whole sound based on the frequency of the received whole sound.

The sound signal processing apparatus may vibrate with a vibration intensity based on an angle between a propagation direction of a received sound and an angle formed by one plane.

The sound signal processing apparatus may vibrate with a high vibration intensity as the angle approaches 90°, and vibrates with a low vibration intensity as the angle approaches 0°.

The sound signal processing apparatus may generate an electrical signal corresponding to the vibration of each of the plurality of vibration structures.

In operation 2420, the sound signal processing apparatus may generate a whole sound signal from the received whole sound.

In operation 2430, the sound signal processing apparatus may generate a user voice signal from which an external sound is attenuated from the whole received sound.

The sound signal processing apparatus may determine an electrical signal to be attenuated from among electrical signals based on a threshold value, and may attenuate the determined electrical signal.

The sound signal processing apparatus may determine the threshold value based on an average magnitude of the electrical signals.

In operation 2440, the sound signal processing apparatus may generate an external sound signal from which the user's voice is attenuated by differentially calculating the user voice signal from the whole sound signal.

The sound signal processing apparatus may generate a feedback signal by inputting a user voice signal to an adaptive filter, and differentially calculating a signal output from the adaptive filter from a whole sound signal, and may control the adaptive filter to adjust parameters by inputting the feedback signal to the adaptive filter.

The sound signal processing apparatus may perform a function corresponding to a user voice signal and a function corresponding to an external sound signal, and display results of each of the functions in different regions of the display.

As described above, the sound signal processing apparatus may generate a user voice signal without an additional separate operation process, and may generate an external sound signal from which the user's voice is attenuated only through simple calculations on the user voice signal and a whole sound signal. The sound signal processing apparatus may perform various functions by using each of the generated user voice signal and the external sound signal.

The method of FIG. 24 described above may be recorded in a computer-readable recording medium in which one or more programs including instructions for executing the method are recorded. Examples of non-transitory computer-readable recording medium include magnetic media, such as hard disks, floppy disks, and magnetic tapes, optical media, such as CD-ROMs and DVDs, magneto-optical media, such as floppy disks, and hardware devices specially configured to store and execute program instructions, such as ROM, RAM, flash memory, and the like. Examples of program instructions include not only machine language codes, such as those generated by a compiler, but also high-level language codes that may be executed by a computer using an interpreter or the like.

The foregoing exemplary embodiments are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A sound signal processing apparatus comprising:
a directional microphone configured to detect a user voice signal comprising a user's voice by arranging the directional microphone to face an utterance point of the user's voice;
a non-directional microphone configured to detect a mixed sound signal comprising the user voice and an external sound;
a processor configured to generate an external sound signal by attenuating the user's voice from the mixed sound signal, by differentially calculating the user voice signal from the mixed sound signal, and process the user voice signal and the external sound signal simultaneously; and
a display configured to display a processing result of the user voice signal and a processing result of the external sound signal in two different regions of the display at a same time, wherein:
the directional microphone comprises vibration structures that vary in length and are configured to sense sound of different frequency bands, and
one side of each of the vibration structures is fixed to a support, and an opposite side of each of the vibration structures extends in a same direction toward a cavity of the support so that extension directions of the vibration structures, from the one side of the support toward the cavity and to the opposite side of the support, are in parallel to one another.

2. The sound signal processing apparatus of claim 1, wherein the vibration structures are configured to sense sound of different frequency bands, and wherein a vibrator included in each of vibration structures vibrates with a vibration intensity based on an angle between a propagation direction of the mixed sound signal and a plane formed by the vibrator for receiving the mixed sound signal.

3. The sound signal processing apparatus of claim 2, wherein the vibrator vibrates with a higher vibration intensity as the angle approaches 90°, and vibrates with a lower vibration intensity as the angle approaches 0°.

4. The sound signal processing apparatus of claim 1, wherein the vibration structures are configured to sense sound of different frequency bands, each of the vibration structures comprises a vibrator that forms a plane for receiving the mixed sound signal, and the directional microphone is arranged so that an angle formed between the plane and a direction from the utterance point of the user's voice is in a range of 60° to 120°.

5. The sound signal processing apparatus of claim 1, wherein the vibration structures are configured to sense sound of different frequency bands, each of the vibration structures comprises a vibrator that forms a plane for receiving the mixed sound signal, and a vibration detector configured to receive a vibration of the vibrator.

6. The sound signal processing apparatus of claim 1, wherein the directional microphone is configured to:
obtain a plurality of electrical signals from the vibration structures of the directional microphone; and
for each electrical signal in the plurality of electrical signals, turn on a switch to transmit the electrical signal to the processor when a degree of excess of the electrical signal compared to a threshold exceeds a preset value, and turn off the switch to block the electrical signal when the degree of excess is less than or equal to the preset value.

7. The sound signal processing apparatus of claim 1, wherein the directional microphone is configured to determine an electrical signal to be attenuated from among electrical signals generated by the vibration structures, and attenuate the determined electrical signal, and
wherein the directional microphone is further configured to determine a threshold value based on an average magnitude of the electrical signals generated by the vibration structures.

8. The sound signal processing apparatus of claim 1, further comprising an adaptive filter configured to adjust parameters that are applied to the user voice signal before the user voice signal is combined with the mixed sound signal, so that the user's voice is attenuated from the mixed sound signal based on a feedback signal,
wherein the parameters comprise a correlation coefficient between the user voice signal and the mixed sound signal, and amplitudes of the user voice signal and the mixed sound signal, and
wherein the processor is further configured to:
generate the feedback signal by differentially calculating a signal output from the adaptive filter from the mixed sound signal as the user voice signal is input to the adaptive filter; and
control the adaptive filter to adjust the parameters by inputting the feedback signal to the adaptive filter.

9. The sound signal processing apparatus of claim 1, wherein the sound signal processing apparatus is a glasses-type wearable apparatus, the directional microphone and the non-directional microphone are arranged on a glasses frame of the glasses-type wearable apparatus, and the directional microphone is arranged so that one plane for receiving the mixed sound faces the utterance point of the user's voice.

10. The sound signal processing apparatus of claim 1, wherein the sound signal processing apparatus is a glasses-type wearable apparatus,
wherein the directional microphone is arranged on a glasses bridge of the glasses-type wearable apparatus, and the non-directional microphone is arranged on a leg of the glasses-type wearable apparatus, and
wherein the display is further configured to indicate a recording state of the external sound signal or a translation result of the external sound signal as the processing result of the external sound signal, and provide a transcript of the user voice signal as the processing result of the user voice signal.

11. The sound signal processing apparatus of claim 1, wherein
the non-directional microphone is configured to generate a first external sound signal from which the user's voice is attenuated, from the mixed sound signal, by arranging a plane receiving the mixed sound signal in a direction different from a direction in which the direction microphone is arranged, and in a direction corresponding to a point where the external sound is generated; and
the processor is further configured to generate a second external sound signal from which the user's voice is further attenuated than that of the first external sound signal, by differentially calculating the user voice signal from the first external sound signal.

12. A method of processing a sound signal, the method comprising:
detecting a user's voice by a directional microphone;
receiving, by a non-directional microphone, a mixed sound including the user's voice and an external sound generated from outside the user;
generating a mixed sound signal from the mixed sound;
generating a user voice signal from which the external sound is attenuated, from the user's voice;
generating an external sound signal from which the user's voice is attenuated, by differentially calculating the user voice signal from the mixed sound signal;
processing the user voice signal and the external sound signal simultaneously; and
displaying a processing result of the user voice signal and a processing result of the external sound signal in two different regions of a display at a same time, wherein:
the directional microphone comprises vibration structures that vary in length and are configured to sense sound of different frequency bands, and
one side of each of the vibration structures is fixed to a support, and an opposite side of each of the vibration structures extends in a same direction toward a cavity of the support so that extension directions of the vibration structures, from the one side of the support toward the cavity and to the opposite side of the support, are in parallel to one another.

13. The method of claim 12, wherein the receiving of the mixed sound comprises:
vibrating each of the vibration structures that are configured to sense sound of different frequency bands, in a direction orthogonal to one plane formed to receive the mixed sound, based on a frequency of the received mixed sound.

14. The method of claim 13, wherein the vibrating each of the plurality of vibration structures comprises vibrating each of the plurality of vibration structures with a vibration intensity based on an angle formed between a propagation direction of the received sound and the one plane.

15. The method of claim 14, wherein the vibrating each of the plurality of vibration structures further comprises vibrating each of the plurality of vibration structures with a higher vibration intensity as an angle approaches 90°, and vibrating each of the plurality of vibration structures with a lower vibration intensity as an angle approaches 0°.

16. The method of claim 13, wherein the vibrating each of the plurality of vibration structures comprises generating electrical signals respectively corresponding to vibrations of the plurality of vibration structures.

17. The method of claim 16, wherein the generating of the user voice signal comprises determining an electrical signal to be attenuated among the electrical signals, based on a threshold value that is set according to an average magnitude of the electrical signals, and attenuating the determined electrical signal.

18. The method of claim 12, wherein the generating of the external sound signal comprises inputting the user voice signal to an adaptive filter, generating a feedback signal by differentially calculating a signal output from the adaptive filter from the mixed sound signal, and controlling the adaptive filter to adjust parameters that are applied to the user voice signal before the user voice signal is combined with the mixed sound signal by inputting the feedback signal to the adaptive filter, wherein the parameters comprise a correlation coefficient between the user voice signal and the mixed sound signal, and amplitudes of the user voice signal and the mixed sound signal.

\* \* \* \* \*